(12) United States Patent
Miki et al.

(10) Patent No.: US 8,534,156 B2
(45) Date of Patent: Sep. 17, 2013

(54) BICYCLE SHIFT OPERATING DEVICE

(75) Inventors: Yoshimitsu Miki, Osaka (JP); Kazutaka Fukao, Osaka (JP); Kazunori Ookubo, Osaka (JP)

(73) Assignee: Shimano Inc., Osaka (JP)

( * ) Notice: Subject to any disclaimer, the term of this patent is extended or adjusted under 35 U.S.C. 154(b) by 12 days.

(21) Appl. No.: 13/116,110

(22) Filed: May 26, 2011

(65) Prior Publication Data

US 2012/0297918 A1 Nov. 29, 2012

(51) Int. Cl.
*F16C 1/10* (2006.01)

(52) U.S. Cl.
USPC .......................................................... 74/502.2

(58) Field of Classification Search
USPC ........................................ 74/488, 489, 502.2
See application file for complete search history.

(56) References Cited

U.S. PATENT DOCUMENTS

| | | | | |
|---|---|---|---|---|
| 5,213,005 A * | 5/1993 | Nagano | ......................... | 74/502.2 |
| 5,257,683 A | 11/1993 | Romano | | |
| 5,400,675 A | 3/1995 | Nagano | | |
| 6,220,111 B1 * | 4/2001 | Chen | .......................... | 74/473.15 |
| 6,397,700 B1 | 6/2002 | Liu et al. | | |
| 7,437,969 B2 * | 10/2008 | Ose | .............................. | 74/502.2 |
| 7,526,979 B2 | 5/2009 | Tsumiyama | | |
| 7,665,382 B2 * | 2/2010 | Kawakami | ...................... | 74/489 |
| 7,721,621 B2 * | 5/2010 | Kawakami | ................... | 74/502.2 |
| 7,802,489 B2 * | 9/2010 | Tsumiyama | ................ | 74/502.2 |
| 8,201,477 B2 * | 6/2012 | Kawakami | ................... | 74/502.2 |
| 2006/0189423 A1 | 8/2006 | Ichida et al. | | |
| 2007/0012137 A1 | 1/2007 | Dal Pra' | | |
| 2007/0151394 A1 * | 7/2007 | Kawakami | ................... | 74/501.6 |
| 2007/0193389 A1 * | 8/2007 | Kawakami | ................... | 74/502.2 |
| 2008/0087126 A1 | 4/2008 | Oda et al. | | |
| 2009/0090209 A1 * | 4/2009 | Hara et al. | ...................... | 74/489 |
| 2009/0173182 A1 | 7/2009 | Watarai | | |
| 2009/0314117 A1 * | 12/2009 | Kawakami | ...................... | 74/489 |
| 2010/0199795 A1 | 8/2010 | Kawakami | | |

FOREIGN PATENT DOCUMENTS

CN 2 764 705 Y 3/2006

OTHER PUBLICATIONS

European Search Report of corresponding EP Application No. 12 15 1514.2 dated Oct. 2, 2012.

* cited by examiner

*Primary Examiner* — James Pilkington
*Assistant Examiner* — Brian McGovern
(74) *Attorney, Agent, or Firm* — Global IP Counselors

(57) ABSTRACT

A bicycle shift operating device is basically provided with a pair of operating members and a take-up member. The take-up member pivots in opposite rotational directions in response to movement of the first and second operating members. The first operating member pivotally supports a pawl member having first and second pawls. The first pawl selectively engages and moves one of a release member and a pulling ratchet in response to the movement of the first operating member. The second pawl selectively engages and moves other of the release member and the pulling ratchet in response to the movement of the second operating member. An abutment portion of the first operating member selectively contacts an abutment portion of the pawl member such that the pawls pivot when one of the first and second operating members is operated.

41 Claims, 16 Drawing Sheets

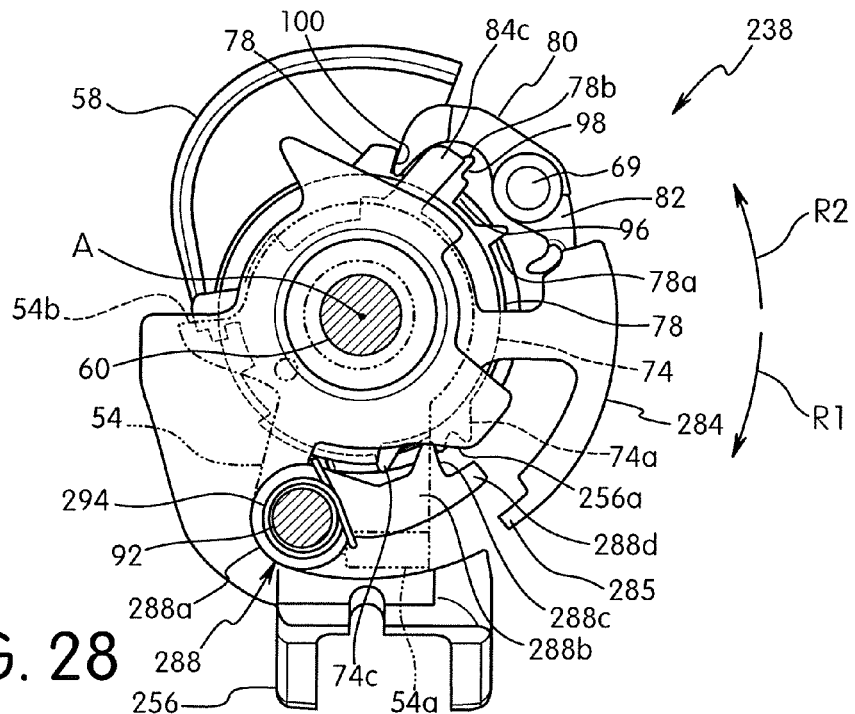
FIG. 28
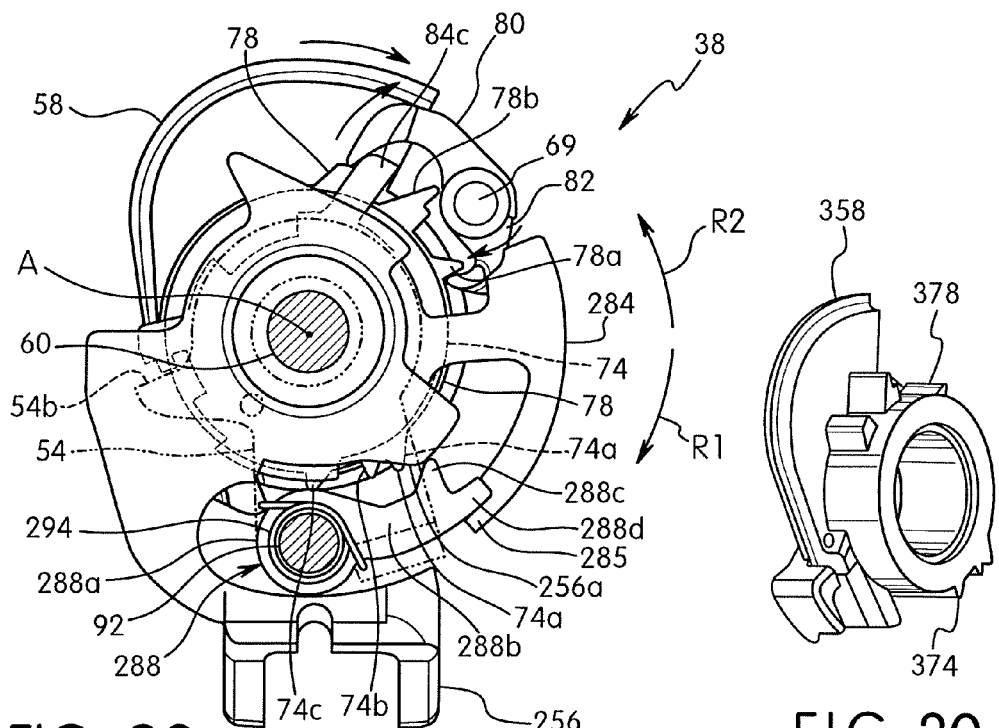
FIG. 29
FIG. 30

BICYCLE SHIFT OPERATING DEVICE

BACKGROUND

1. Field of the Invention

This invention generally relates to a bicycle shift operating device. More specifically, the present invention relates to a bicycle shift operating device that is operates a bicycle component using a control cable.

2. Background Information

Bicycle shift operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gear changing devices (e.g., a derailleur or an internal hub gear mechanism) to select a desired gear ratio. A pedaling force from the rider is transferred from the front sprockets to the rear sprockets via the chain for turning the rear wheel.

Most mechanical brake/shift operating devices use control cables that connects the brake/shift operating devices to the brake devices for braking and the gear changing devices for shifting. These control cables are typically Bowden type cables with an outer case and an inner wire. For shifting, a shift lever is usually used for operating the brake device. For example, the brake lever is also used as one of the shift lever for pulling the shift cable, while a separate lever is provided for releasing the shift cable. An operating force is typically applied by one of the rider's fingers to operate the shift levers, which in turn transmits the operating force to the shift cable via a shift operating unit. In many cases, the shift operating unit has a shift cable take-up spool. The inner wire of the shift cable is attached at one end to the cable take-up spool and its other end is attached to a part of a gear changing device such as a derailleur or an internal hub gear mechanism. The inner wire of the shift cable is wrapped (pulled) or unwrapped (released) about a peripheral edge of the shift cable take-up spool of the shift operating unit to pull and release the inner wire. By rotating the cable take-up spool, the inner wire slides within the outer case to pull or release the inner wire that operates the gear changing device. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a new bicycle shift operating device that pulls and releases a moving member (e.g., a take-up member) using a relatively simple arrangement.

In view of the state of the known technology, a bicycle shift operating device is disclosed that basically comprises a first operating member, a second operating member, a take-up member, a release member, a pulling ratchet and a pawl member. The second operating member includes a first abutment portion. The take-up member is pivotally supported to pivot in a first rotational direction in response to the movement of the first operating member and to pivot in a second rotational direction in response to the movement of the second operating member, the first rotational direction being opposite of the second rotational direction. The release member is movably supported to operatively release the take-up member. The pulling ratchet is fixedly coupled to the take-up member to pivot with the take-up member. The pawl member is pivotally supported on the first operating member. The pawl member includes a first pawl, a second pawl and a second abutment portion. The first pawl selectively engages and moves one of the release member and the pulling ratchet in response to the movement of the first operating member. The second pawl selectively engages and moves other of the release member and the pulling ratchet in response to the movement of the second operating member. The second abutment portion selectively contacts the first abutment portion of the second operating member such that the pawl member pivots when one of the first and second operating members is operated.

Various objects, features, aspects and advantages of the present disclosure will become apparent to those skilled in the art from the following detailed description, which, taken in conjunction with the annexed drawings, discloses two embodiments of a bicycle shift operating device.

BRIEF DESCRIPTION OF THE DRAWINGS

Referring now to the attached drawings which form a part of this original disclosure:

FIG. 28 is a front side view of the selected parts of the shift operating unit illustrated in FIGS. 26 and 27, but with the pull operating member being rotated from the shift operating position of FIG. 27 back to the rest position such that the front derailleur is held in the low trim position (the first intermediate position) with the chain remaining on the inner gear;

FIG. 29 is a front side view of the selected parts of the shift operating unit illustrated in FIGS. 26 to 28, but with the release operating member being rotated to release the inner wire such that the front derailleur is moved from the low trim position (the first intermediate position) to the low position (the innermost position) with the chain remaining on the inner gear; and FIG. 30 is a perspective view of a take-up member that has a pulling ratchet integrally formed as a one-piece member with the take-up member.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
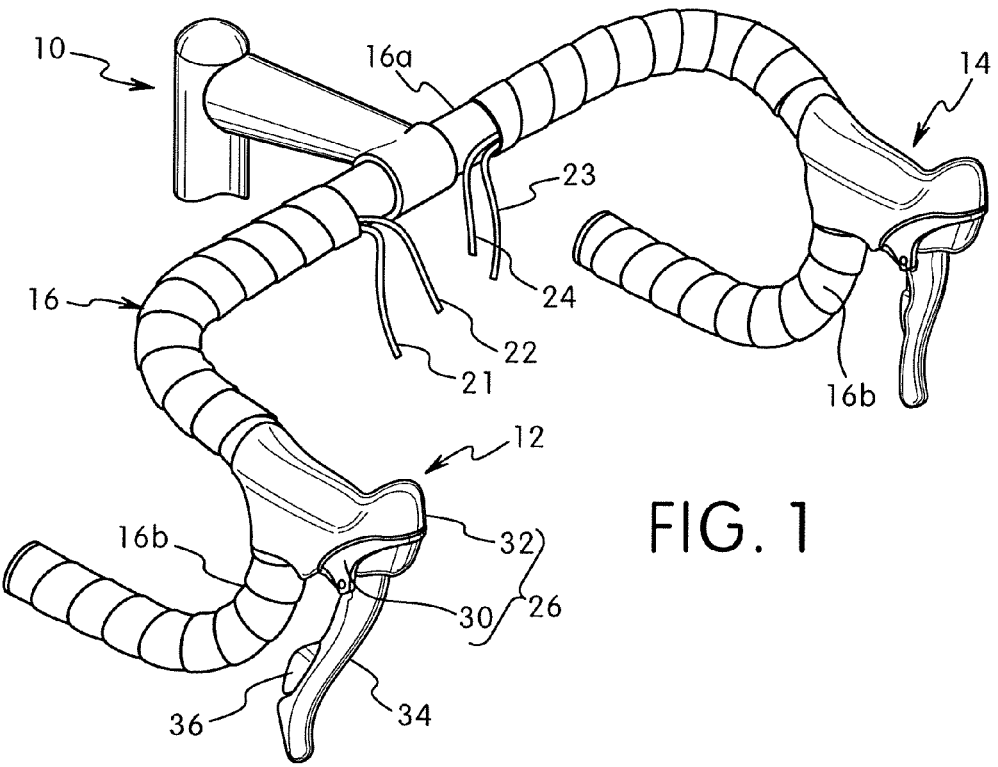
FIG. 1 is a front perspective view of a portion of a bicycle equipped with a pair of bicycle shift operating devices coupled to a drop type handlebar in their installed positions in accordance with a first embodiment.
Figure 2:
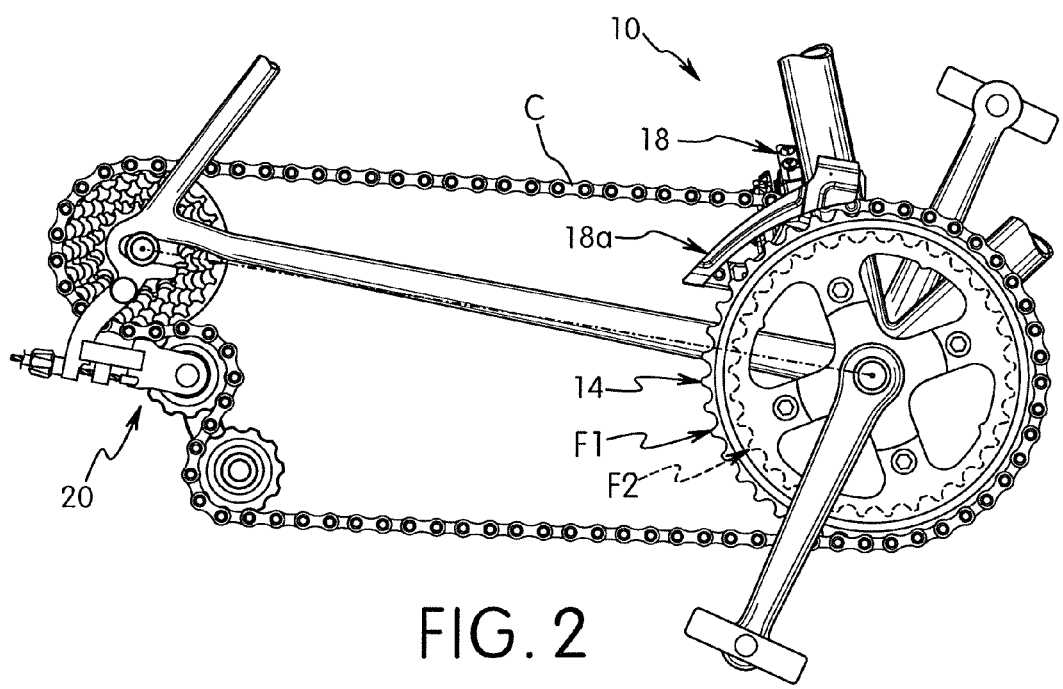
FIG. 2 is a side elevational view of a portion of a bicycle drive train that is operated by the bicycle shift operating devices illustrated in FIG. 1.

Referring initially to FIGS. 1 and 2, a bicycle driving system of a bicycle 10 that is equipped with a pair of bicycle shift operating devices 12 and 14 is illustrated. The bicycle shift operating devices 12 and 14 are mounted on a drop down handlebar 16 in accordance with the illustrated embodiments as seen in FIG. 1. The bicycle shift operating device 12 is a right hand side control device operated by the rider's right hand to operate a first brake device (not shown) and a first gear shifting device 18 (e.g., a cable operated front derailleur) as shown in FIG. 2. The bicycle shift operating device 14 is a left hand side control device operated by the rider's left hand to operate a second brake device (not shown) and a second gear shifting device 20 (e.g., a cable operated rear derailleur) as shown in FIG. 2. The first and second gear shifting devices 18 and 20 are part of the bicycle driving system that is used to shift a bicycle chain C for changing speeds of the drive train in a relatively conventional manner. In the illustrated embodiment, the bicycle shift operating device 12 is operatively coupled to the first gear shifting device 18 via a shift control cable 21 and the first brake device (not shown) via a brake control cable 22. The bicycle shift operating device 14 is operatively coupled to the second gear changing device 20 via a shift control cable 23 and the second brake device (not shown) via a brake control cable 24.

Figure 3:
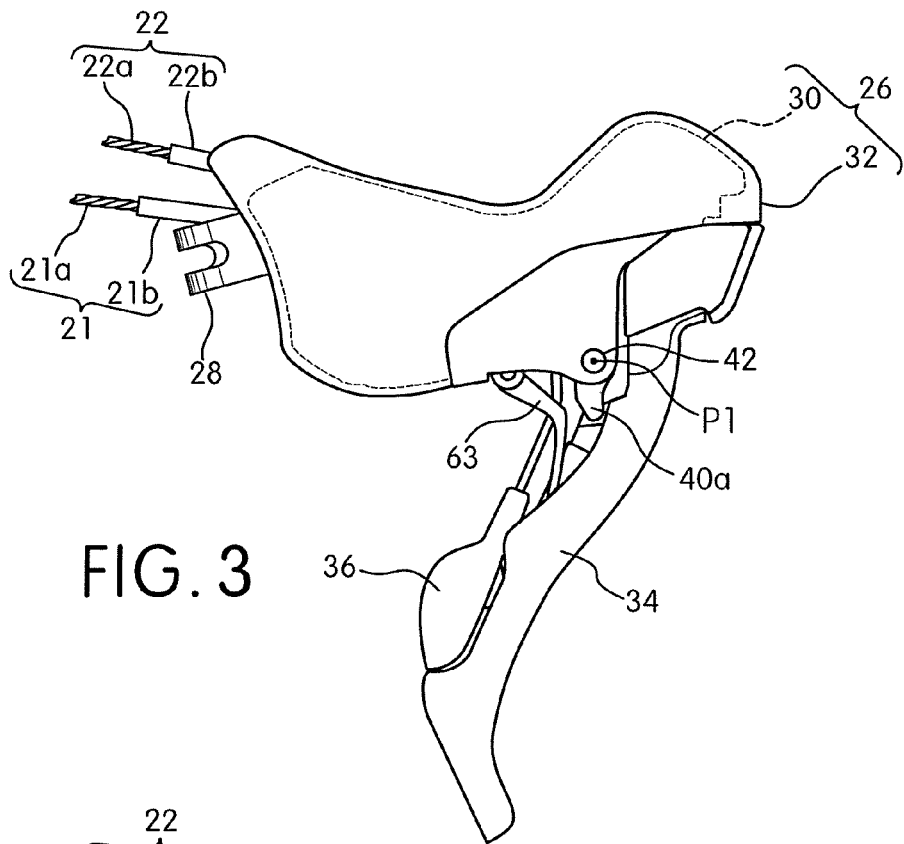
FIG. 3 is an outside elevational view of the right hand side shift operating devices illustrated in FIG. 1 with the brake/shift lever and the shift (release) lever in their rest positions.
Figure 4:
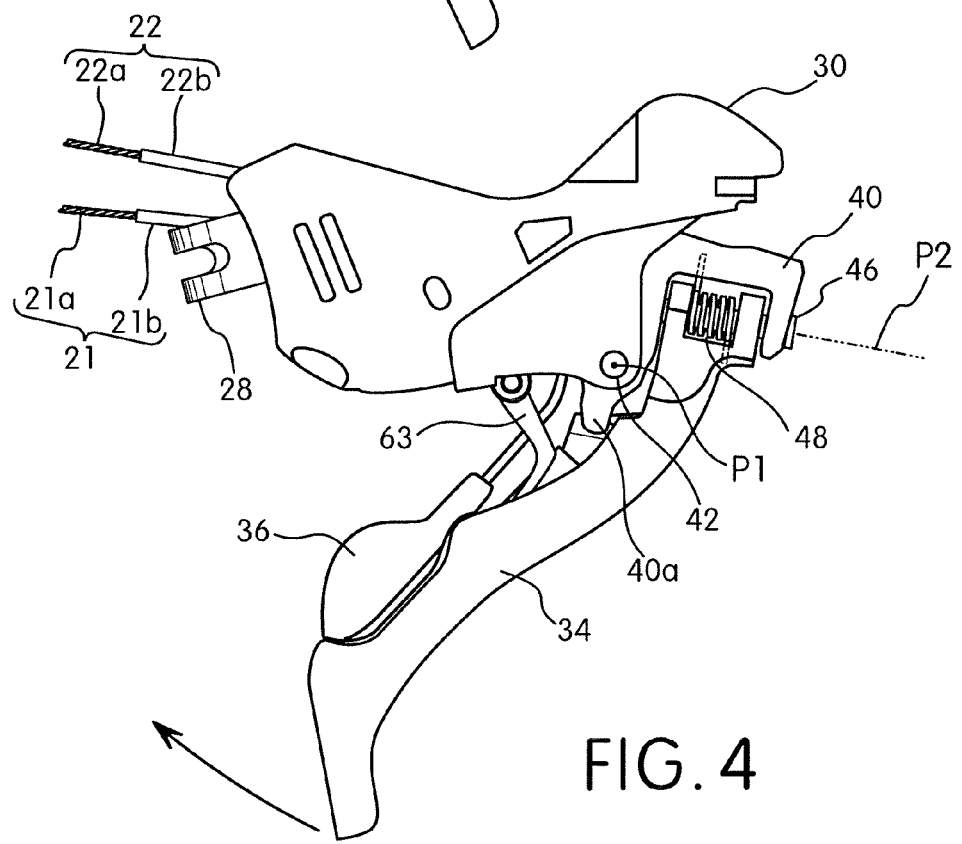
FIG. 4 is an outside elevational view of the right hand side shift operating device illustrated in FIG. 3 with the grip cover removed and the brake/shift lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 3 and 4, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle shift operating device 12 to the first gear shifting device 18 for shifting the first gear shifting device 18 in response to operation of the bicycle shift operating device 12.

In the illustrated embodiment, the right and left hand side bicycle shift operating devices 12 and 14 are essentially identical in operation, except that they are mirror images of each other and they may have a different number of shift operations. In other words, the left hand side bicycle shift operating device 14 is substantially identical to the right hand side bicycle shift operating device 12, except for the shifting unit (not shown) of the left hand side bicycle shift operating device 14 has been modified to be a mirror image and to increase the number of gears that can be shifted. Thus, only the right hand side bicycle shift operating device 12 will be discussed and illustrated herein.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16. In the illustrated embodiment, the bicycle shift operating device 12 is mounted on the right hand side of the drop down handlebar 16 for operating the first gear shifting device 18 (e.g., a cable operated front derailleur) and the bicycle shift operating device 14 is mounted on the left hand side of the drop down handlebar 16 for operating the second gear shifting device 20 (e.g., a cable operated rear derailleur). However, each of the shift operating devices 12 and 14 can be manufactured as a mirror of the illustrated embodiment, such that the shift operating devices 12 and 14 can be mounted on opposite sides of the drop down handlebar 16.

As seen in FIGS. 3 and 4, the bicycle shift operating device 12 includes a bracket or base member 26 that is fixedly mounted to one of the curved portions 16b of the drop down handlebar 16 by a handlebar mounting structure 28. Since the bracket 26 is fixed to the drop down handlebar 16 by the handlebar mounting structure 28, the bracket 26 constitutes a fixed member. Riders sometimes grip the bracket 26 and lean on the bracket 26 during riding. It is desirable to provide a comfortable feeling for the rider's hand while the rider is gripping the bracket 26. Thus, the bracket 26 has a rigid main body 30 and a soft outer elastomeric grip cover 32. The grip cover 32 partially covers the main body 30 as seen in FIG. 3. In particular, the grip cover 32 is stretched over a gripping portion of the main body 30. Typically, the main body 30 is made of a rigid plastic material. The bracket 26 is a stationary member when mounted to the handlebar 16. The handlebar mounting structure 28 is preferably a conventional band clamp or similar structure that is used in a road shifter for mounting to a drop down style handlebar such as the drop down handlebar 16. Thus, the handlebar mounting structure 28 will not be discussed in detail herein.

Figure 5:
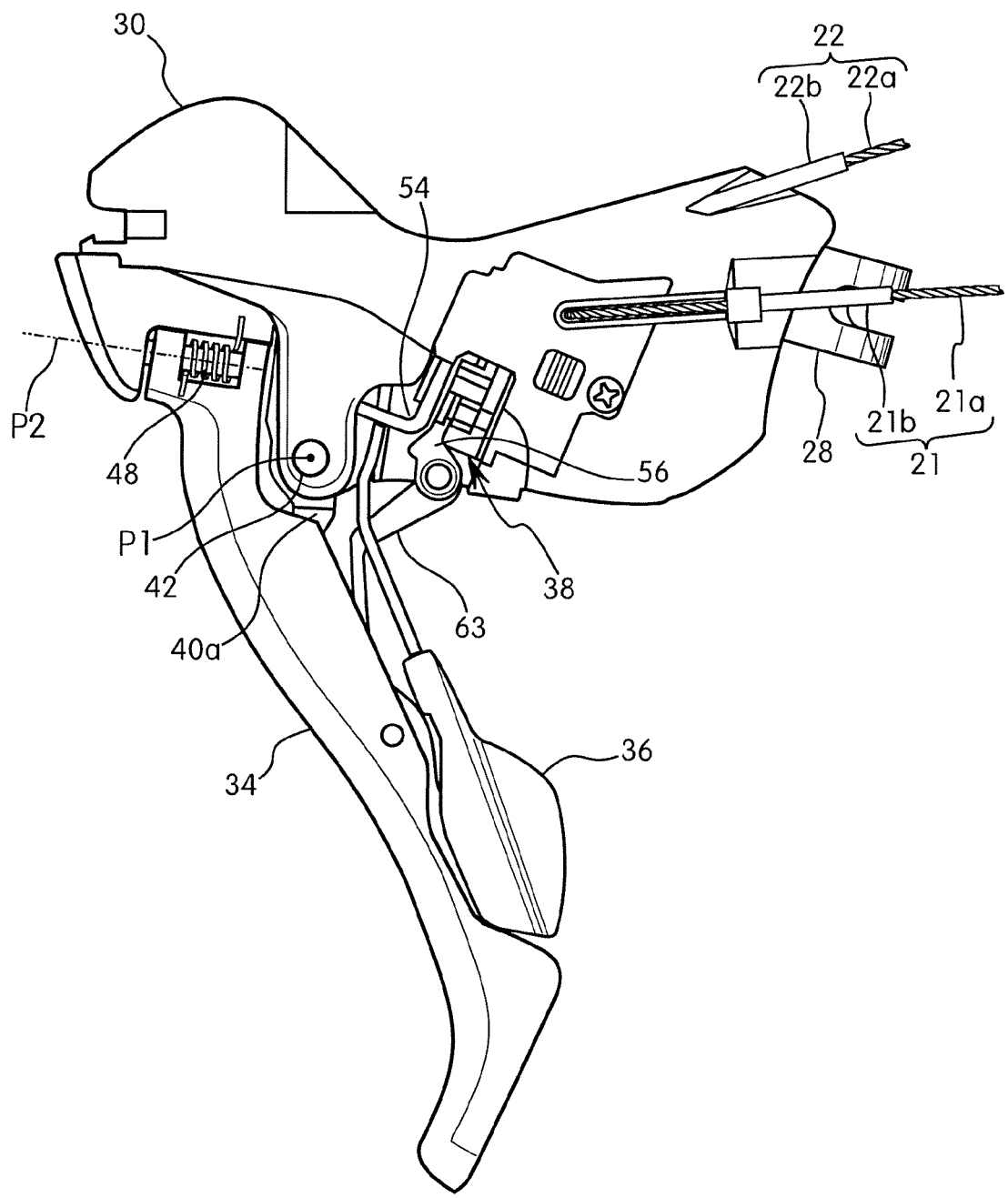
FIG. 5 is an inside elevational view of the right hand side shift operating device illustrated in FIGS. 3 and 4 with the grip cover removed and the brake/shift lever and the shift (release) lever in their rest positions.

In this embodiment, as best seen in FIG. 5, the bicycle shift operating device 12 further includes a brake/shift lever 34, a shift lever 36 and a shift operating unit 38. The main body 30 of the bracket 26 houses the shift operating unit 38 in an interior cavity of the main body 30. The brake/shift lever 34 and the shift lever 36 are examples of user operated levers used for operating the shift operating unit 38 as discussed below. The brake/shift lever 34 and the shift lever 36 are movable with respect to the bracket 26 to operate the shift operating unit 38.

The brake/shift lever 34 is used to perform both a braking operation and a shifting operation, while the shift lever 36 only performs a shifting operation. The brake/shift lever 34 and the shift lever 36 are operatively coupled to the shift operating unit 38 for performing shifting operations in the gear shifting device 18 to change gears (i.e., shifting the chain C between the gears F1 and F2). The brake/shift lever 34 and the shift lever 36 are preferably both pivoted relative to the main body 30 of the bracket 26 in a direction towards a bicycle longitudinal center plane for performing shifting operations.

As seen in FIG. 2, a conventional drive train of the bicycle 10 is illustrated that is operated by the first and second gear shifting devices 18 and 20. The first gear shifting device 18 is a conventional cable operated front derailleur that moves a bicycle chain C between a first or outer gear F1 having a first diameter and a second or inner gear F2 using a guiding portion 18a (i.e., a chain guide). The first or outer gear F1 is the largest front sprocket, and has a first diameter. The second or inner gear F2 is the smallest front sprocket, and has a second diameter that is smaller than the first diameter of the first or outer gear F1. The gears F1 and F2 form a gear assembly or crankset of the bicycle driving system. The second gear shifting device 20 is a conventional cable operated rear derailleur that moves the bicycle chain C between a plurality of rear gears R in a conventional manner. The first and second gear shifting devices 18 and 20 are not limited to being used with conventional cable operated derailleurs.

Figures 6, 7:
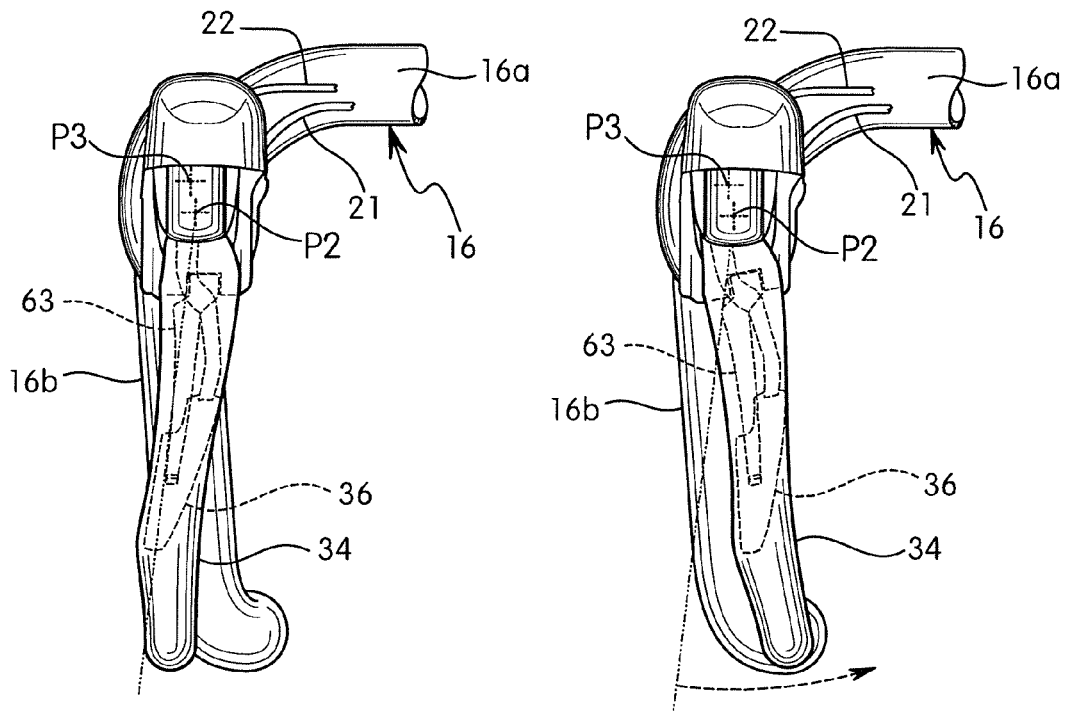
FIG. 6 is a front elevational view of the portion of the drop type handlebar and the right hand side shift operating device illustrated in FIGS. 3 to 5 with the brake/shift lever and the shift (release) lever in their rest positions.
FIG. 7 is a front elevational view of the portion of the drop type handlebar and the right hand side shift operating device illustrated in FIG. 6 with the brake/shift lever of the right hand side shift operating device moved to a first cable winding position.
Figure 8:
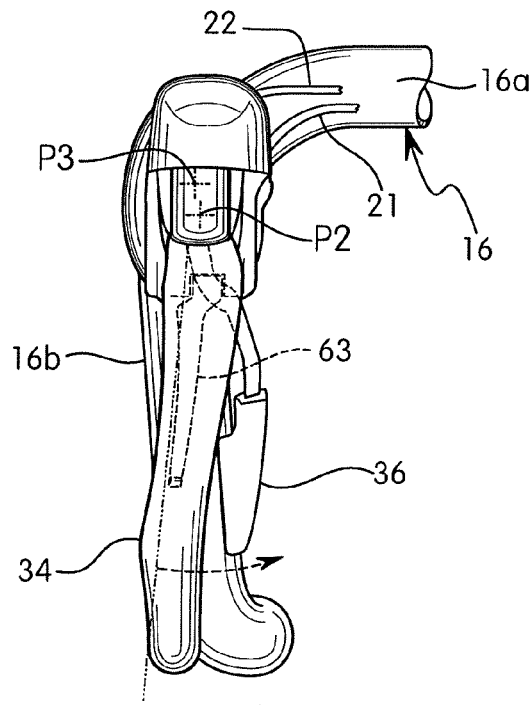
FIG. 8 is a front elevational view of the portion of the drop type handlebar and the right hand side shift operating device illustrated in FIGS. 6 to 7 with the shift (release) lever of the right hand side shift operating device moved to a cable releasing position.

Referring to FIGS. 6 to 8, shifting operations of the brake/shift lever 34 and the shift lever 36 are illustrated. The brake/shift lever 34 and the shift lever 36 are shown in their rest positions in FIG. 6. The term "rest position" as used herein refers to a state in which the part (e.g., the brake/shift lever 34 and the shift lever 36) remains stationary without the need of a user holding the part in that state corresponding to the rest position. The brake/shift lever 34 and the shift lever 36 are trigger type levers that are biased to the rest positions in a conventional manner. The brake/shift lever 34 functions as a brake lever. The brake/shift lever 34 pulls the inner wire 22a of the brake cable 22 by pivoting the brake/shift lever 34 about a brake pivot axis P1 relative to the main body 30 of the bracket 26 towards the curved portion 16b of the handlebar 16. The brake/shift lever 34 also functions as a cable pulling (winding) lever. The brake/shift lever 34 pulls the inner wire 21a of the shift cable 21 into the shift operating unit 38 by pivoting the brake/shift lever 34 about a shift pivot axis P2 relative to the main body 30 of the bracket 26 towards a center longitudinal plane of the bicycle 10. The shift lever 36 functions as a cable releasing lever. The shift lever 36 releases the inner wire 21a from the shift operating unit 38 by pivoting the shift lever 36 about a shift pivot axis P3 relative to the main body 30 of the bracket 26 towards the center longitudinal plane of the bicycle 10. In the first illustrated embodiment, the shift lever 36 moves with the brake/shift lever 34 as the brake/shift lever 34 is moved to perform braking operations and shifting operations as discussed below. However, the brake/shift lever 34 generally remains stationary during movement of the shift lever 36 to perform shifting operations as discussed below.

Referring to FIGS. 4 and 9 to 11, a support member 40 is provided to support the brake/shift lever 34 and the shift lever 36 on the main body 30 of the bracket 26. The support member 40 is pivotally attached to the main body 30 of the bracket 26 by a pivot pin 42 that defines the brake pivot axis P1. A biasing element 44 is provided between the main body 30 and the support member 40. The biasing element 44 is arranged for biasing the support member 40 and the brake/shift lever 34 to a rest position as seen in FIG. 5. In the first illustrated embodiment, the biasing element 44 is a torsion spring with its coiled portion disposed on the pivot pin 42 and its first and second free ends contacting the main body 30 and the support member 40, respectively.

Figure 9:
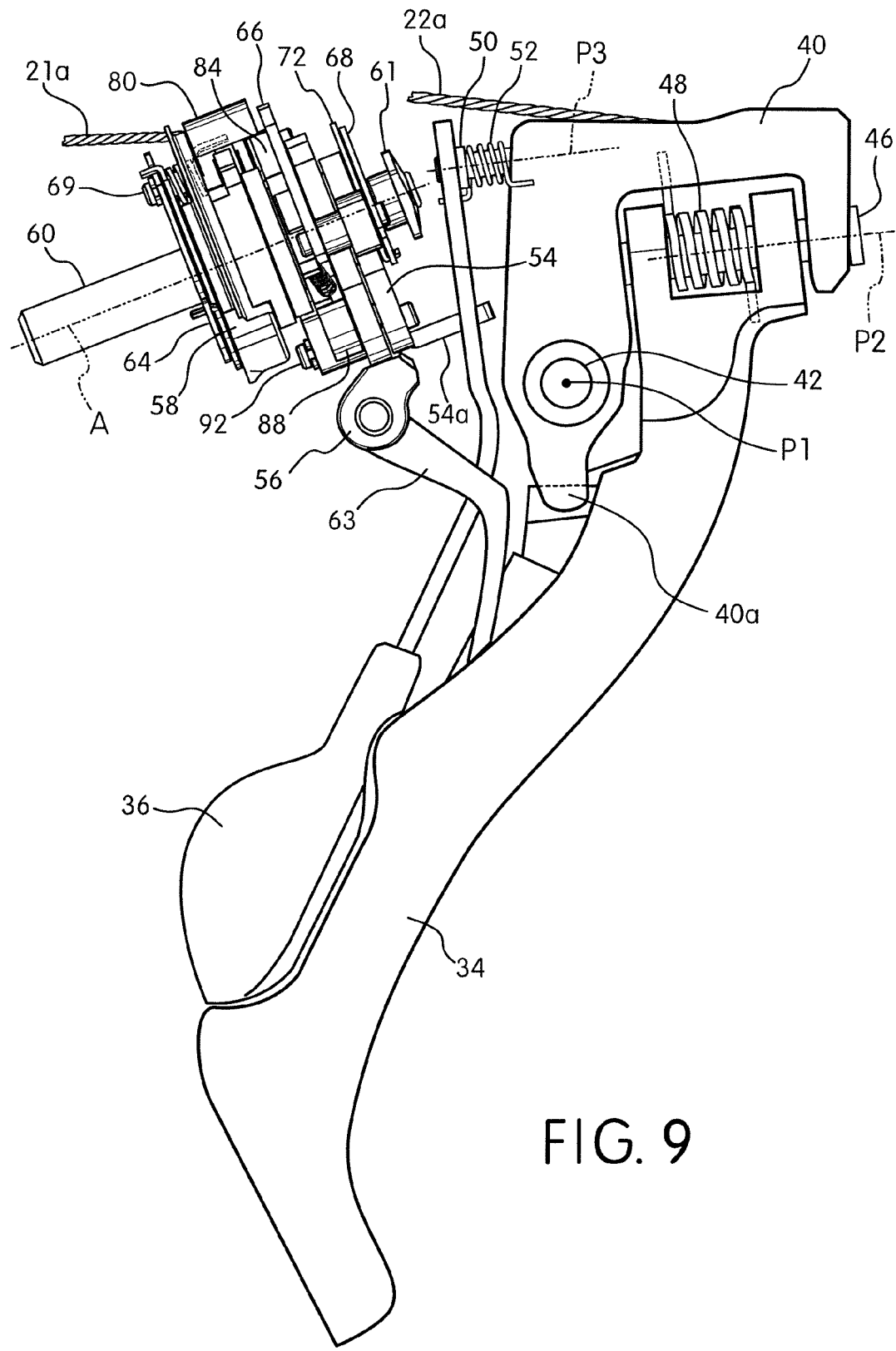
FIG. 9 is an outside elevational view of the shift operating unit of the right hand side shift operating device and the brake/shift lever and the shift (release) lever of the right hand side shift operating device in their rest positions.
Figure 10:
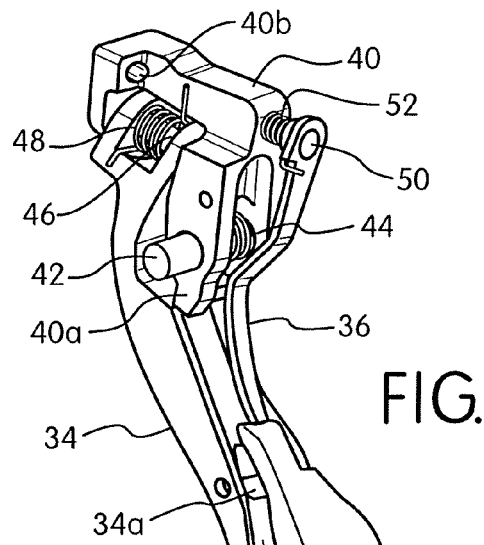
FIG. 10 is a rear side perspective view of the brake/shift lever and the shift (release) lever of the right hand side shift operating device.
Figure 11:
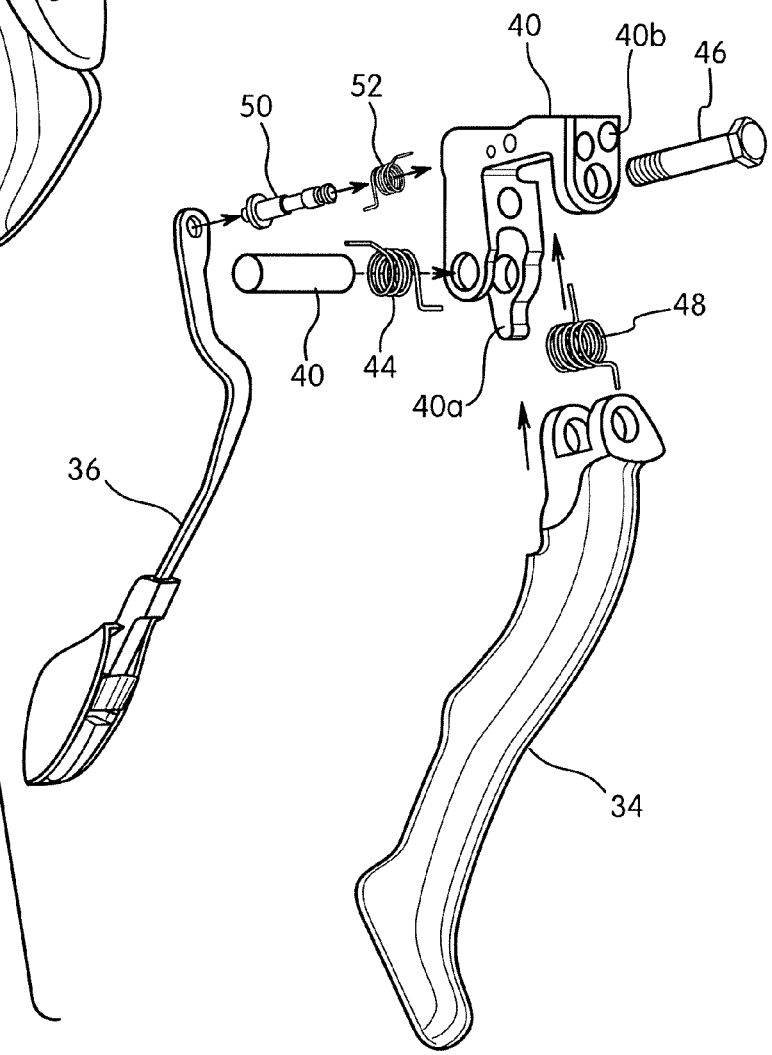
FIG. 11 is an exploded front side perspective view of the brake/shift lever and the shift (release) lever of the right hand side shift operating device.

As best seen in FIGS. 9 to 11, the brake/shift lever 34 is pivotally attached to the support member 40 by a pivot pin 46 that defines the shift pivot axis P2. A biasing element 48 is provided between the brake/shift lever 34 and the support member 40. The biasing element 48 is arranged for biasing the brake/shift lever 34 to a rest position against a tab 40a of the support member 40 as seen in FIGS. 4 and 5. In the first illustrated embodiment, the biasing element 48 is a torsion spring with its coiled portion disposed on the pivot pin 46 and its first and second free ends contacting the brake/shift lever 34 and the support member 40, respectively.

As best seen in FIGS. 10 and 11, the support member 40 also includes a brake cable attachment structure 40b (e.g., a bore) for attaching the inner wire 22a. When the brake/shift lever 34 is pivoted about the brake pivot axis P1, the brake/shift lever 34 pulls the inner wire 22a relative to the outer case 22b to perform a braking operation. Generally speaking, in performing braking operations, the brake/shift lever 34 moves in a longitudinal direction with respect to the bracket 26. In other words, during a braking operation, the brake/shift lever 34 moves along a brake operating plane that is substantially perpendicular the shift operating planes of the brake/shift lever 34 and the shift lever 36. Thus, the brake/shift lever 34 moves with respect to the bracket 26 about the brake pivot axis P1 that is perpendicular to the shift pivot axes P2 and P3.

Referring to FIGS. 6 and 7, in performing a shifting (cable winding or pulling) operation with the brake/shift lever 34, the brake/shift lever 34 is moved (pivoted) laterally inward about the shift pivot axis P2 from the rest position (FIG. 6) to a cable winding position (FIG. 7) to perform a gear shift operation.

Referring to FIGS. 9 to 11, the shift lever 36 is also pivotally mounted to the support member 40 by a pivot pin 50 about the shift pivot axis P3. The shift pivot axis P3 can be either parallel to the shift pivot axis P2 or angled with respect to the shift pivot axis P2 as viewed in a direction parallel to the brake pivot axis P1. A biasing element 52 is provided between the brake/shift lever 34 and the support member 40 for biasing the shift lever 36 to a rest position. In the first illustrated embodiment, the biasing element 52 is a torsion spring with its coiled portion disposed on the pivot pin 50 and its first and second free ends contacting the shift lever 36 and the support member 40, respectively.

In performing a shifting (releasing) operation with the shift lever 36, as seen in FIGS. 6 and 8, the shift lever 36 is moved laterally inward about the shift pivot axis P3 from the rest position (FIG. 6) to a cable releasing position (FIG. 8) to perform a gear shift operation. In this illustrated embodiment, when the shift lever 36 is moved to perform a shifting operation, the brake/shift lever 34 does not move with the shift lever 36. Rather during performing a shifting operation with the shift lever 36, the brake/shift lever 34 basically remains in its rest position due to the biasing force of the biasing element 48.

Generally speaking, in performing shifting operations, the brake/shift lever 34 and the shift lever 36 both move in a lateral direction with respect to the bracket 26 along shift operating planes to operate the shift operating unit 38. While in this illustrated embodiment, the shift pivot axes P2 and P3 are not coincident (offset), the shift pivot axes P2 and P3 could be made to be coincident if needed and/or desired. Moreover, the shift operating unit 38 can be operated in a variety of different ways, if needed and/or desired. For example, the shift operating unit 38 could be operated with buttons instead of levers.

Figure 12:
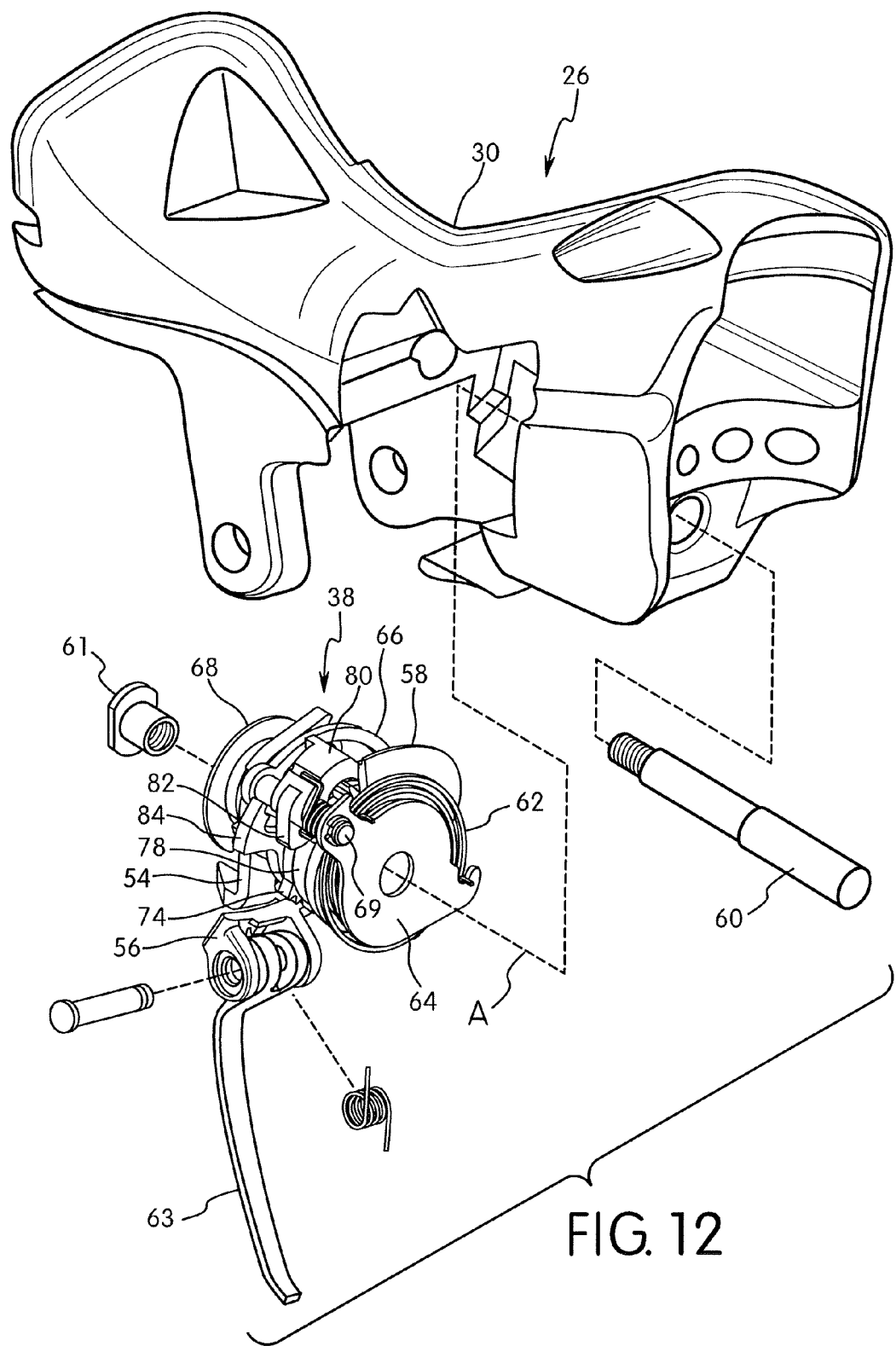
FIG. 12 is an exploded front side perspective view of the bracket and the shift operating unit of the right hand side shift operating device.
Figure 13:
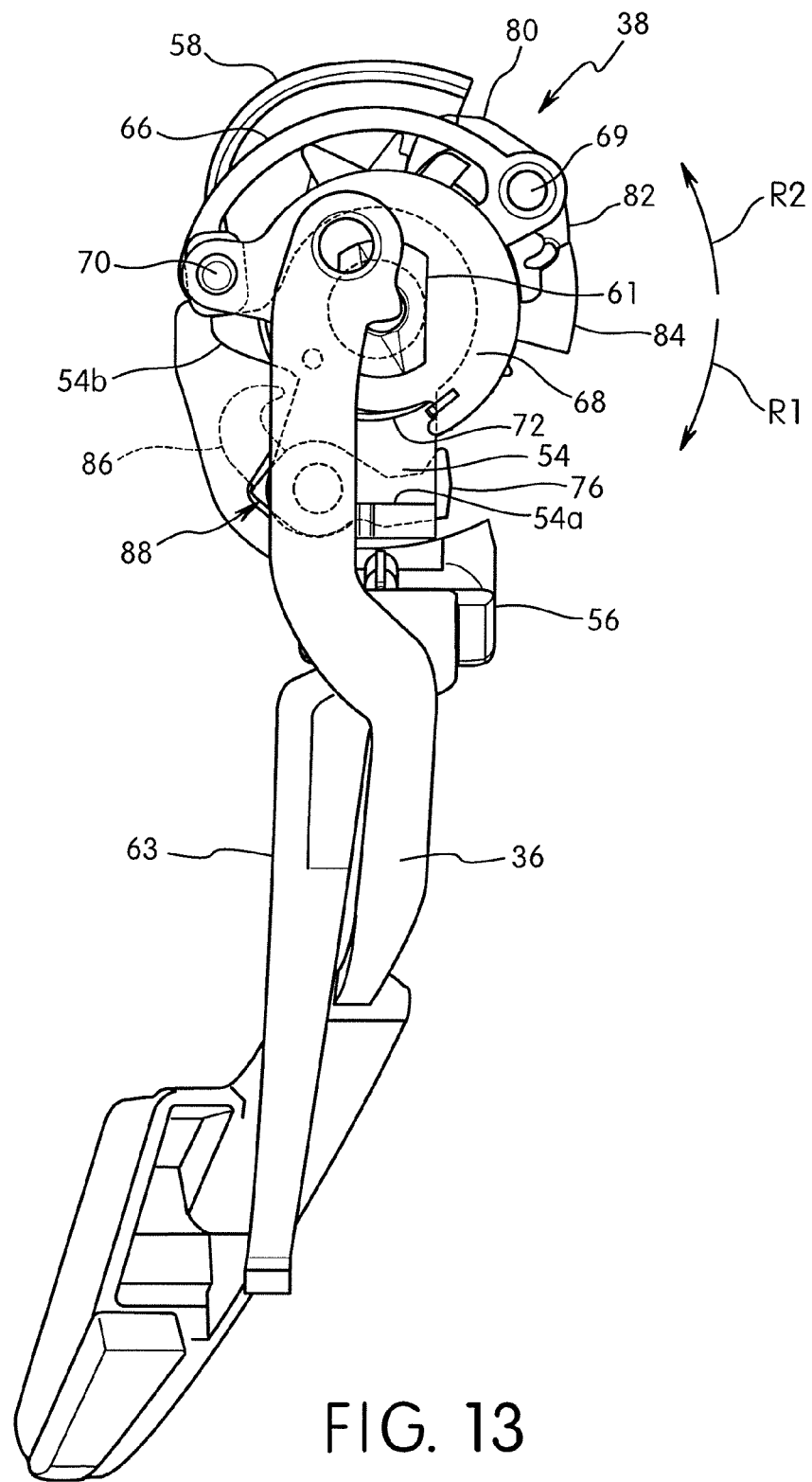
FIG. 13 is a front side perspective view of the shift operating unit and the shift (release) lever of the right hand side shift operating device as viewed along the center axis of main shift unit axle.
Figures 14, 15:
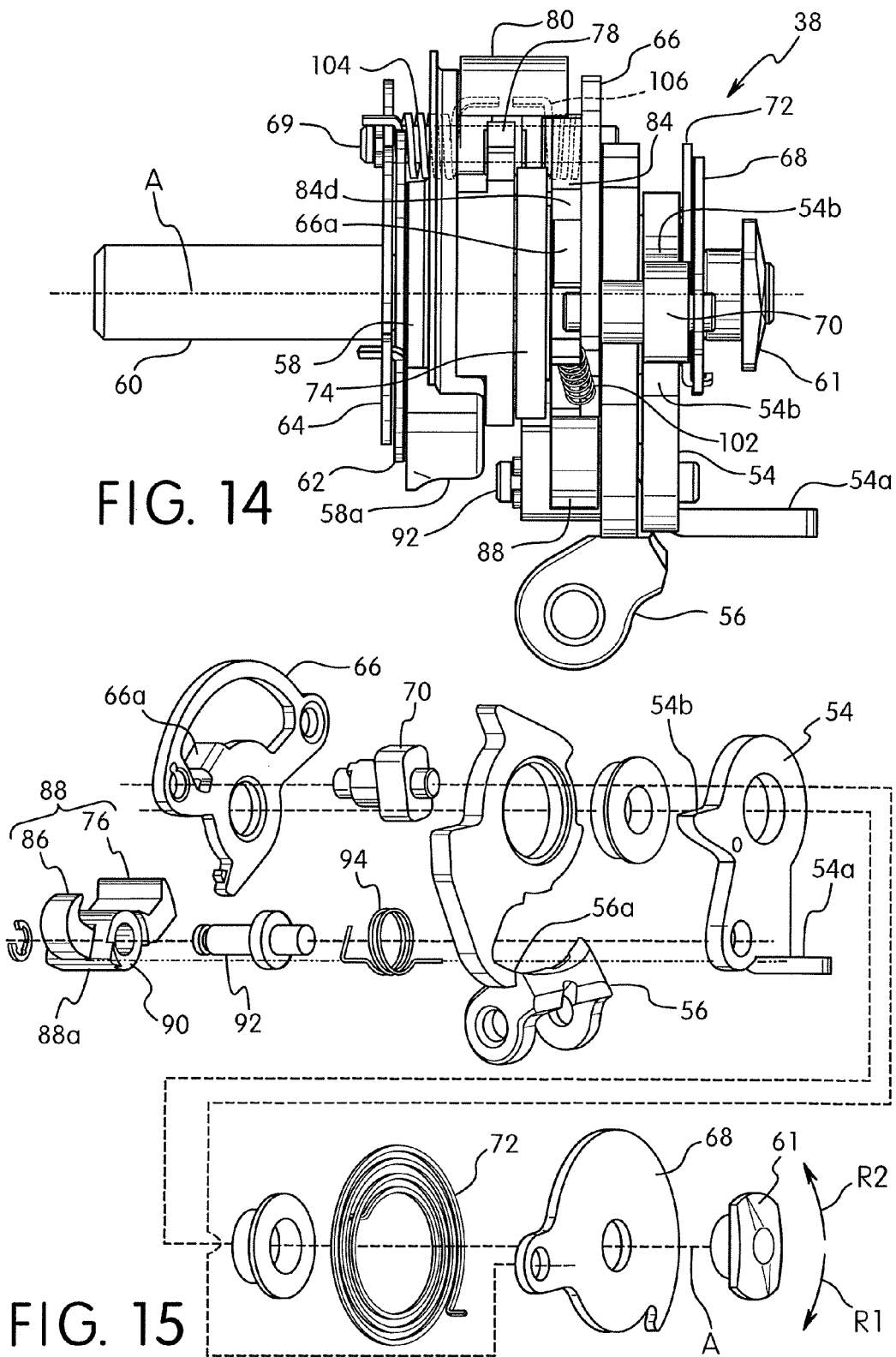
FIG. 14 is an enlarged outside elevational view of the shift operating unit of the right hand side shift operating device.
FIG. 15 is an exploded perspective view of selected parts of the shift operating unit of the right hand side shift operating device.

Turning now to FIGS. 12 to 17, the shift operating unit 38 will now be discussed. As seen in FIG. 12, the shift operating unit 38 is mounted on the main body 30 of the bracket 26. The shift operating unit 38 basically includes a first operating member 54, a second operating member 56 and a cable take-up member or spool 58. The take-up member 58 and the first and second operating members 54 and 56 are coaxially arranged on a main shift axle 60 of the shift operating unit 38. The main shift axle 60 defines a main pivot axis A of the shift operating unit 38. The main shift axle 60 pivotally supports the take-up member 58 and the first and second operating members 54 and 56 to the bracket 26 for rotation on the main pivot axis A (FIG. 14). In the first embodiment, the main pivot axis A is angled with respect to the shift axes P2 and P3 as viewed in a direction parallel to the brake pivot axis P1. Basically, the take-up member 58 pivots in opposite rotational directions about the main pivot axis A in response to operation of the first and second operating members 54 and 56 as discussed below.

In the first illustrated embodiment, the take-up member 58 is biased in a first rotational direction R1 by a biasing element 62 (FIG. 15). The take-up member 58 constitutes a wire winding body or a moving member. The take-up member 58 is pivotally supported on the main shift axle 60 to pivot with respect to the bracket 26 (e.g., the fixed member) in the first rotational direction R1 in response to the movement of the first operating member 54. Also the take-up member 58 is pivotally supported on the main shift axle 60 to pivot with respect to the bracket 26 (e.g., the fixed member) in a second rotational direction R2 in response to the movement of the second operating member 56. The first rotational direction R1 is an opposite rotational direction from the second rotational direction R2 with respect to the main pivot axis A.

Figure 17:
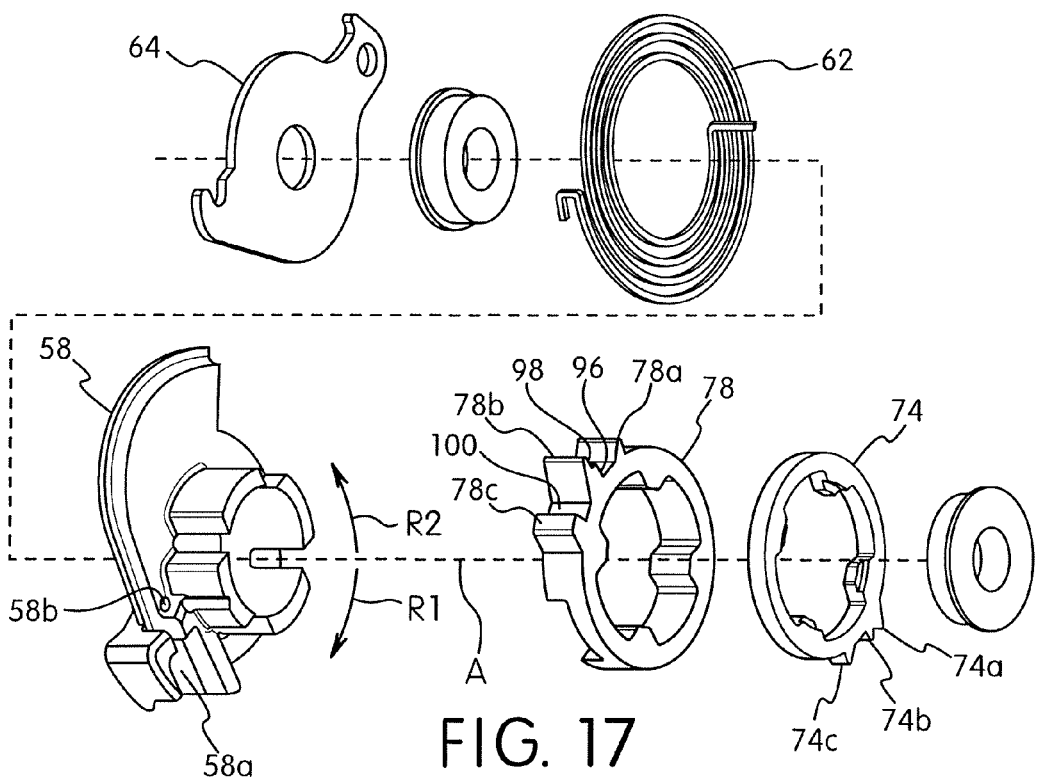
FIG. 17 is an exploded perspective view of selected parts of the shift operating unit of the right hand side shift operating device.

As best seen in FIG. 17, the take-up member 58 has a shift wire attachment structure 58a for attaching the inner wire 21a of the cable 21 thereto. Rotation of the take-up member 58 in the first rotational direction R1 results in the inner wire 21a of the cable 21 being unwound from the peripheral edge of the take-up member 58. Conversely, rotation of the take-up member 58 in the second rotational direction R2 results in the inner wire 21a of the cable 21 being wound on the peripheral edge of the take-up member 58.

Operation of the first operating member 54 causes the take-up member 58 to move in the first rotational direction R1 for releasing the inner wire 21a. The first operating member 54 is operated by the rider pivoting the shift lever 36 about the shift pivot axis P3. In particular, the first operating member 54 has a contact member or flange 54a that is contacted by the shift lever 36 such that the first operating member 54 is pivoted in response to pivotally movement of the shift lever 36. As a result, the shift lever 36 is operatively coupled to the shift operating unit 38 to perform a cable releasing operation of the take-up member 58. In the first illustrated embodiment, the first operating member 54 is pivoted in the second rotational direction R2 with respect to the main pivot axis A of the take-up member 58 by the shift lever 36 to selectively operate the take-up member 58 in the first rotational direction R1. As explained below, the shift lever 36 and the first operating member 54 are biased in the first rotational direction R1 to their respective rest positions such that the shift lever 36 and the first operating member 54 return to their respective rest positions after the shift lever 36 is released.

On the other hand, operation of the second operating member 56 causes the take-up member 58 to move in the second rotational direction R2 for pulling the inner wire 21a. The second operating member 56 is operated by the rider pivoting the brake/shift lever 34 about the shift pivot axis P2. In particular, the second operating member 56 has a connecting member 63 (FIGS. 9, 12 and 13) that is contacted by the brake/shift lever 34 such that the second operating member 56 is pivoted in response to pivotally movement of the brake/shift lever 34. The connecting member 63 is pivotally mounted at one end to the second operating member 56 by a hinge connection and biased into slidably engagement with a rearward facing surface of the brake/shift lever 34 at the other end. As seen in FIG. 10, an attachment member 34a is provided on the rearward facing surface of the brake/shift lever 34 to slidably retain the lower end of the connecting member 63 to the brake/shift lever 34. Thus, the connecting member 63 can pivot in a rearward direction when the brake/shift lever 34 is pivoted in the rearward direction to perform a braking operation while the connecting member 63 still remains attached to the brake/shift lever 34. In this way, the connecting member 63 connects the brake/shift lever 34 to the shift operating unit 38. As a result, the brake/shift lever 34 is operatively coupled to the shift operating unit 38 to perform a cable pulling or winding operation of the take-up member 58.

In the first illustrated embodiment, the second operating member 56 is pivoted in the second rotational direction R2 with respect to the main pivot axis A of the take-up member 58 by the brake/shift lever 34 to selectively operate the take-up member 58 in the second rotational direction R2. As explained below, the brake/shift lever 34 and the second operating member 56 are biased in the first rotational direction R1 to their respective rest positions such that the brake/shift lever 34 and the second operating member 56 return to their respective rest positions after the brake/shift lever 34 is released.

As seen in FIGS. 14 to 17, the shift operating unit 38 further includes a rear stationary plate 64, a middle stationary plate 66 and a front stationary plate 68. The stationary plates 64, 66 and 68 are rigid members that are all mounted on the main shift axle 60. The stationary plates 64, 66 and 68 are non-movable with respect to the main body 30 of the bracket 26. The rear stationary plate 64 is fixed to the middle stationary plate 66 by a pivot pin 69, while the front stationary plate 68 is fixed to the middle stationary plate 66 by a stop pin 70. Thus, the stationary plates 64, 66 and 68 are fixed together and contact the main body 30 of the bracket 26 such that the stationary plates 64, 66 and 68 are held stationary by the main body 30.

The rear stationary plate 64 provides an attachment point for the biasing element 62 of the take-up member 58. In particular, the biasing element 62 is a torsion spring that has a first end hooked on the rear stationary plate 64 and a second end coupled to the take-up member 58. Regarding the second end of the biasing element 62, the take-up member 58 has a hole 58b (FIG. 17) for receiving the second end of the biasing element 62. Thus, the biasing element 62 biases the take-up member 58 in the first rotational direction R1.

The stop pin 70 is mounted between the middle stationary plate 66 and the front stationary plate 68. The stop pin 70 acts as a stop for both of the first and second operating members 54 and 56. In particular, the stop pin 70 limits rotation of the first and second operating members 54 and 56 in the first rotational direction R1 to establish the rest positions of the first and second operating members 54 and 56. In the first illustrated embodiment, the first operating member 54 is biased against the stop pin 70 by a biasing element 72, while the second operating member 56 is biased against the stop pin 70 by the biasing element 48 that is provided between the brake/shift lever 34 and the support member 40. Of course, it will be apparent from this disclosure that an additional biasing element can be provided for biasing second operating member 56 to its rest position. The biasing element 72 is provided between the front stationary plate 68 and the first operating member 54. As mentioned above, the biasing element 72 is arranged for biasing the first operating member 54 to its rest position against the stop pin 70. In the first illustrated embodiment, the biasing element 72 is a torsion spring with its coiled portion disposed on the main shift axle 60 and its first and second free ends contacting the first operating member 54 and the front stationary plate 68, respectively.

Referring to FIGS. 14 to 17, the shift operating unit 38 further includes a pulling ratchet or plate 74, a pulling pawl 76, a positioning ratchet or plate 78, a positioning pawl 80, a stopping pawl 82, a release member or plate 84 and a release pawl 86. The positioning ratchet 78, the positioning pawl 80, the stopping pawl 82 and the release member 84 of the shift operating unit 38 constitutes a shift positioning mechanism that selectively maintains the take-up member 58 (e.g., the moving member) in any one of four different shift positions. Since the shift positions of the take-up member 58 (e.g., the moving member) correspond to guiding positions of the guiding portion 18a, the shift positions of the take-up member 58 and the guiding positions of the guiding portion 18a that correspond to each other will be referred to using the same term, i.e., shift positions will be referred to as guiding positions.

The pulling ratchet 74, the positioning ratchet 78 and the release member 84 are coaxially arranged with the take-up member 58 on the main shift axle 60. The pulling ratchet 74 and the positioning ratchet 78 are arranged to rotate with the take-up member 58 on the main shift axle 60, while the release member 84 rotates relative to the take-up member 58 on the main shift axle 60. As explained below, the pulling pawl 76 selectively engages the pulling ratchet 74 to rotate the take-up member 58 on the main shift axle 60 in the second rotational direction R2 in response to operation of the second operating member 56. The positioning pawl 80 and the stopping pawl 82 selectively engage the positioning ratchet 78 to hold the take-up member 58 from rotating on the main shift axle 60 in the first rotational direction R1. The release pawl 86 selectively engages the release member 84 to rotate the release member 84 on the main shift axle 60 in the second rotational direction R2 in response to operation of the first operating member 54. Rotation of the release member 84 results in the release member 84 selectively moving such that the positioning pawl 80 and the stopping pawl 82 to selectively release the positioning ratchet 78.

In first illustrated embodiment, the pulling pawl 76 and the release pawl 86 are integrally formed as a one-piece, unitary pawl member 88. It will be apparent from this disclosure that the pulling pawl 76 and the release pawl 86 can be two pieces that are non-movably fixed together to form the pawl member 88, if needed and/or desired. The pawl member 88 is pivotally supported on the first operating member 54. The pawl member 88 includes a mounting portion 90 that is disposed between the pulling pawl 76 and the release pawl 86 such that the pulling pawl 76 and the release pawl 86 extend in opposite directions from the mounting portion 90. The mounting portion 90 of the pawl member 88 is pivotally mounted on the first operating member 54 by a pivot pin 92 such that the pawl member 88 moves with the first operating member 54. The pivot pin 92 defines a secondary pivot axis that is offset from the main pivot axis A.

A biasing element 94 is provided between the first operating member 54 and the pawl member 88 for biasing the pawl member 88. The pulling pawl 76 is biased away from the pulling ratchet 74 and the release pawl 86 is biased towards the release member 84. Thus, during a cable pulling operation of the shift operating unit 38, the release pawl 86 moves away from the release member 84 as the pulling pawl 76 moves into engagement with the pulling ratchet 74. In the first illustrated embodiment, the biasing element 94 is a torsion spring with its coiled portion disposed on the pivot pin 92 and its first and second free ends contacting the first operating member 54 and the pawl member 88, respectively.

In the first illustrated embodiment, the release pawl 86 contacts the release member 84 while the first and second operating members 54 and 56 are in their rest positions. However, alternatively, the release pawl 86 can be initially held out of contact with the release pawl 86 and then move into contact with the release member 84 after the first operating member 54 is operated.

The second operating member 56 includes a first abutment portion 56a that contacts a second abutment portion 88a of the pawl member 88 when the second operating member 56 is operated (i.e., pivoted from the rest position to a shifting position about the main pivot axis A). The second abutment portion 88a is formed on the mounting portion 90 of the pawl member 88. The second abutment portion 88a extends from the mounting portion 90 in the first rotational direction R1 with respect to the main pivot axis A of the take-up member 58. The first abutment portion 56a of the second operating member 56 acts as a first cam portion, while the second abutment portion 88a acts as a second cam portion.

The first abutment portion 56a of the second operating member 56 contacts the second abutment portion 88a of the pawl member 88 when the second operating member 56 is operated. As a result of the first abutment portion 56a of the second operating member 56 contacting the second abutment portion 88a of the pawl member 88, the pawl member 88 pivots on the pivot pin 92 against the biasing force of the biasing element 94 for engaging the pulling pawl 76 with the pulling ratchet 74. Also as a result of the first abutment portion 56a of the second operating member 56 contacting the second abutment portion 88a of the pawl member 88, the release pawl 86 moves away from the release member 84. Thus, operation of the second operating member 56 also results in the first operating member 54 and the pawl member 88 being moved with the second operating member 56. The contact between the first and second abutments 56a and 88a also causes the pulling pawl 76 to engage the pulling ratchet 74. Also as a result of the movement of operation of the second operating member 56, the take-up member 58, the pulling ratchet 74 and the positioning ratchet 78 are all rotated together about the main pivot axis A.

The pulling ratchet 74 will now be discussed now with respect to FIGS. 17 to 23. The pulling ratchet 74 is a rigid ring shaped member that is fixedly coupled to the take-up member 58 to pivot with the take-up member 58 on the main shift axle 60. In particular, the pulling ratchet 74 has a noncircular opening that mates with a corresponding noncircular hub of the take-up member 58. While the take-up member 58 and the pulling ratchet 74 are shown as separate members, it will be apparent from this disclosure that the take-up member 58 and the pulling ratchet 74 can be a one-piece, unitary member as needed and/or desired. In any event, the take-up member 58 and the pulling ratchet 74 are pivotally mounted as a unit on the main shift axle 60.

The pulling pawl 76 selectively engages and moves the pulling ratchet 74 response to the movement of the second operating member 56. In particular, the pulling ratchet 74 has a peripheral surface that is provided with a first pull tooth 74a, a second pull tooth 74b and a third pull tooth 74c. The pulling pawl 76 selectively engages the pull teeth 74a, 74b and 74c to rotate the pulling ratchet 74 in the second rotational direction R2, which results in the take-up member 58 also rotating in the second rotational direction R2.

Figure 16:
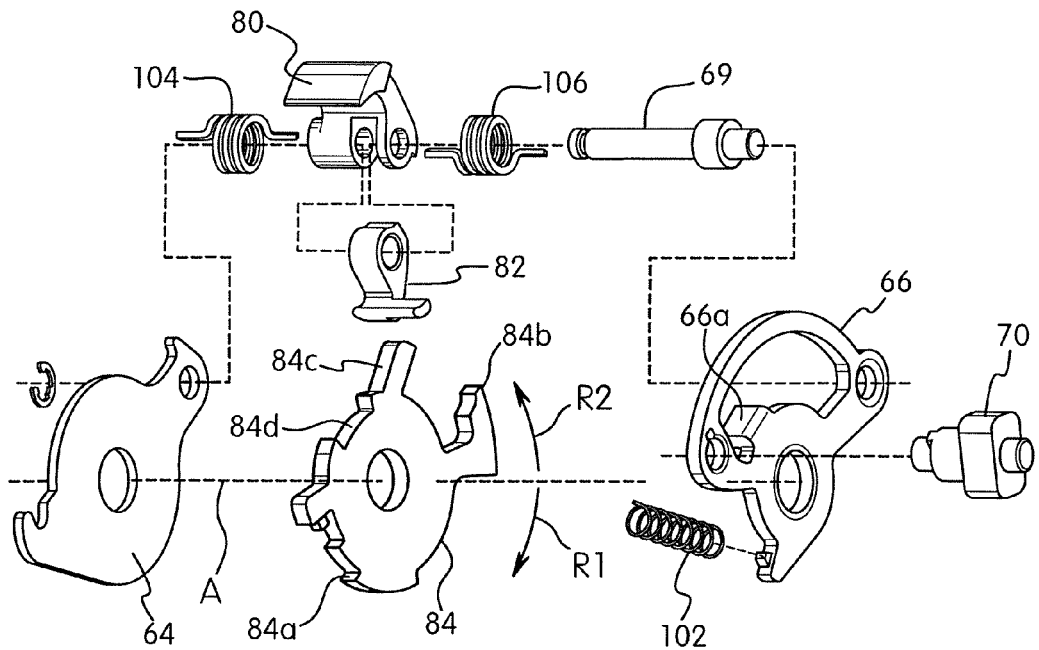
FIG. 16 is an exploded perspective view of selected parts of the shift operating unit of the right hand side shift operating device.

The positioning ratchet 78 will now be discussed in more detail. As best seen in FIGS. 16 and 17, the positioning ratchet 78 is a rigid ring shaped member that is fixedly coupled to the take-up member 58 to pivot with the take-up member 58 on the main shift axle 60. In other words, the positioning ratchet 78 constitutes a positioning member that rotates with the take-up member 58. In particular, in the first illustrated embodiment, the positioning ratchet 78 has a noncircular opening that mates with a corresponding noncircular hub of the take-up member 58.

The positioning ratchet 78 includes a stop tooth 78a that forms an abutment or stop for selectively being engaged with a stopping tooth of the stopping pawl 82. More specifically, the stopping pawl 82 is moved into the path of the stop tooth 78a of the positioning ratchet 78 to selectively engage and stop movement of the positioning ratchet 78 in response to the movement of the first operating member 54. The stopping pawl 82 engages the stop tooth 78a of the positioning ratchet 78 during rotation of the positioning ratchet 78 in the first rotational direction R1 from a first guiding position to a second guiding position in response to a single operation of the first operating member 54 such that the positioning ratchet 78 and the take-up member 58 both momentarily stop in a position between the first guiding position and the second guiding position.

The positioning ratchet 78 further includes a first positioning tooth 78b and a second positioning tooth 78c. The positioning pawl 80 selectively engages the first positioning tooth 78b while the take-up member 58 is in the first guiding position. The positioning pawl 80 selectively engages the second positioning tooth 78c while the take-up member 58 is in the second guiding position. More specifically, in the first illustrated embodiment, the first positioning tooth 78b forms a first stop surface 96 of the positioning ratchet 78 and a second stop surface 98 of the positioning ratchet 78. The second positioning tooth 78c forms a third stop surface 100 of the positioning ratchet 78. The stop surfaces 96, 98 and 100 are abutments for selectively being engaged with a positioning tooth of the positioning pawl 80.

Figure 18:
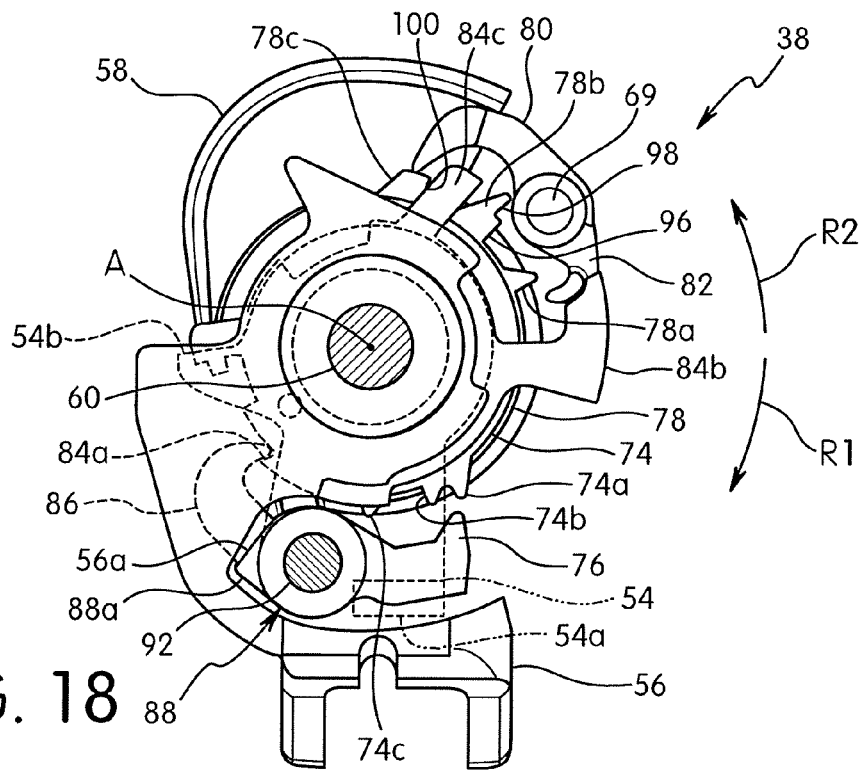
FIG. 18 is a front side view of selected parts of the shift operating unit as viewed along the center axis of the main shift unit axle, with the shift operating unit being in a fully released position such that the front derailleur is held in a low position (the innermost position) with the chain on the inner gear.

The release member 84 will now be discussed in more detail. As best seen in FIGS. 16 and 18, the release member 84 is a rigid ring shaped member that is pivotally supported on the main shift axle 60. The release member 84 is not limited to a plate like member as illustrated. The release member 84 can have a different configuration as needed and/or desired. Thus, the release member 84 is a release member that selectively moves the positioning pawl 80 and the stopping pawl 82 to selectively release the positioning ratchet 78. In any case, in the first illustrated embodiment, the release member 84 is configured and arranged to rotate relative to the take-up member 58 on the main shift axle 60. As mentioned above, the release member 84 is movably supported to operatively release the take-up member 58. The release member 84 is biased to a rest position by a biasing element 102. In the first illustrated embodiment, the biasing element 102 is a coil spring that is preloaded in a slightly compressed state to bias the release member 84 to its rest position. Thus, the release member 84 is movably arranged between a non-releasing position that corresponds to the rest position and a releasing position that rotates the positioning pawl 80 and the stopping pawl 82.

The release member 84 includes an operating tooth 84a for selectively being engaged with the release pawl 86. More specifically, the release pawl 86 selectively engages the operating tooth 84a to move the release member 84 in response to the movement of the first operating member 54. This movement of the release member 84 moves the positioning pawl 80 and the stopping pawl 82 for controlling movement of the positioning ratchet 78. In particular, the release member 84 includes a first pawl operating projection 84b and a second pawl operating projection 84c for controlling movement of the positioning ratchet 78. The release member 84 also includes a cutout 84d that receives a tab 66a of the middle stationary plate 66 for limiting rotation of the release member 84.

More specifically, the first pawl operating projection 84b is configured and arranged to pivot the stopping pawl 82 into the path of the stop tooth 78a to momentarily stop rotation of the positioning ratchet 78 in the first rotational direction R1. In other words, the first pawl operating projection 84b forms a first contact portion that contacts the stopping pawl 82 while the release member 84 is in the releasing position to pivot the stopping pawl 82 to catch the stop tooth 78a. As a result, when the take-up member 58 is released by the release member 84, the first pawl operating projection 84b pivots the stopping pawl 82 to catch the stop tooth 78a to momentarily stop rotation of the positioning ratchet 78 in the first rotational direction R1 during a shifting (releasing) operation by the first operating member 54.

The second pawl operating projection 84c is configured and arranged to pivot the positioning pawl 80 out of the paths of the first and second positioning teeth 78b and 78c. In other words, the second pawl operating projection 84c forms a second contact portion that contacts the positioning pawl 80 while the release member 84 is in the releasing position to pivot the positioning pawl 80 out of engagement with the first and second positioning teeth 78b and 78c. As a result of the positioning pawl 80 being pivoted outwardly from the positioning ratchet 78, the positioning ratchet 78 is released for pivotal movement in the first rotational direction R1 during a shifting (releasing) operation by the first operating member 54. Thus, the take-up member 58 can pivot to release a predetermined amount of the inner wire 21a.

The positioning pawl 80 and the stopping pawl 82 are pivotally mounted on the pivot pin 69 to selectively control the movement of the positioning ratchet 78 such that the take-up member 58 is selectively maintained in the guiding positions. As mentioned above, the pivot pin 69 is mounted to the stationary plates 64 and 66. A first biasing element 104 is mounted on the pivot pin 69 for biasing the positioning pawl 80 into engagement with the positioning ratchet 78. In other words, the positioning pawl 80 is biased towards engagement with the positioning ratchet 78 such that the positioning tooth of the positioning pawl 80 contacts with the positioning ratchet 78 while the release member 84 is in the non-releasing position. A second biasing element 106 is mounted on the pivot pin 69 for biasing the stopping pawl 82 out of engagement with the positioning ratchet 78. The stopping pawl 82 is biased out of engagement with the positioning ratchet 78 such that the stopping tooth of stopping pawl 82 separates from the positioning ratchet 78 while the release member 84 is in the non-releasing position. Thus, the positioning pawl 80 and the stopping pawl 82 move independently with respect to each other. Also the pivot pin 69 defines a secondary pivot axis that is offset from the main pivot axis A. In the illustrated embodiment, the release member 84 rotates the positioning pawl 80 and the stopping pawl 82 such that the stopping tooth of the stopping pawl 82 starts to move from the non-stop position to the stop position prior to the positioning tooth of the positioning pawl 80 starting to move from the holding position to the non-holding position.

Basically, the positioning pawl 80 moves between a holding position and a non-holding position. In the holding position, the positioning pawl 80 holds the take-up member 58 from moving in the first rotational direction R1 by selectively engaging the first and second positioning teeth 78b and 78c. In the non-holding position, the positioning pawl 80a is disengaged from the first and second positioning teeth 78b and 78c by the release member 84.

Basically, the stopping pawl 82 selectively moves between a non-stop position and a stop position. In the non-stop (rest) position, the stopping pawl 82 is located out of the path of the stop tooth 78a of the positioning ratchet 78. In the stop position, the stopping pawl 82 is located along the path of the stop tooth 78a of the positioning ratchet 78 by the release member 84 to catch and hold the take-up member 58 (i.e., the moving member) from moving in the first rotational direction R1. The stopping tooth moves closer to the second rotational axis as the stopping pawl rotates from the unrestricting position to the stop position.

Figure 19:
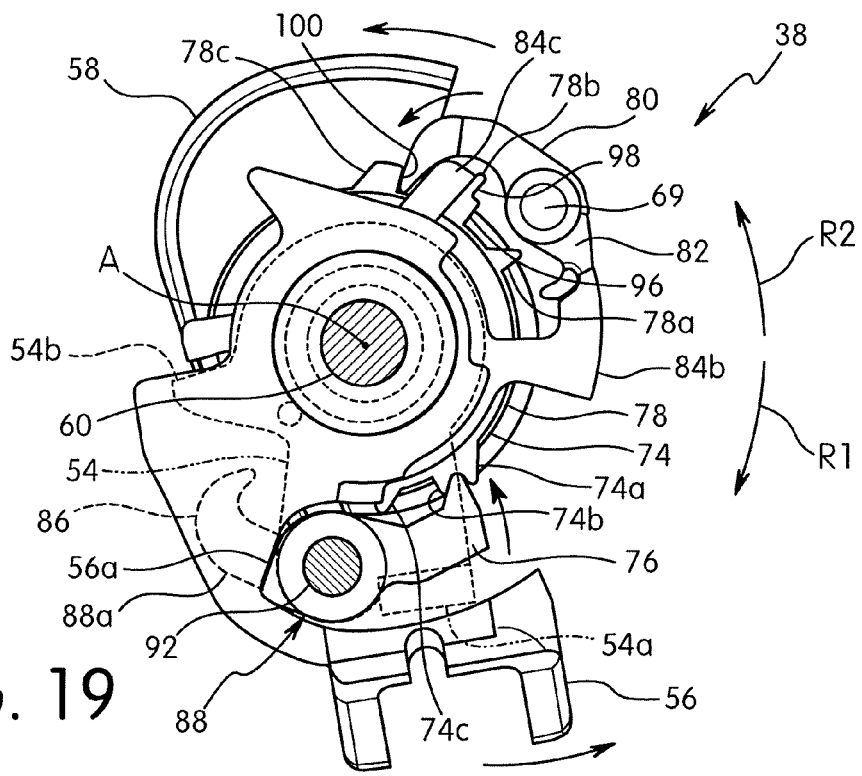
FIG. 19 is a front side view of the selected parts of the shift operating unit illustrated in FIG. 18, but with the pull operating member being rotated to pull the inner wire such that the front derailleur is moved to a low trim position (the first intermediate position) with the chain remaining on the inner gear.

A cable pulling or winding operation of the shift operating unit 38 will now be discussed with reference primarily to FIGS. 18 to 24. Cable pulling operations of the shift operating unit 38 are performed by the rider pivotally moving the brake/shift lever 34 about the shift pivot axis P2 in the lateral inward direction towards the bicycle longitudinal center plane. The brake/shift lever 34 is operated in a single progressive movement such that in the second operating member 56 moves in a single progressive movement in the second rotational direction R2. FIGS. 18, 20, 22 and 24 illustrate the second operating member 56 in its rest position. FIGS. 19, 21 and 23 illustrate the second operating member 56 in its shifting position.

As seen in FIG. 18, the shift operating unit 38 is in a fully released position such that the positioning pawl 80 is contacting the outer tip of the second positioning tooth 78c. As mentioned above, a cable pulling or winding operation of the shift operating unit 38 is performed by the rider pivotally moving the brake/shift lever 34. This pivotal movement of the brake/shift lever 34 is transmitted to the second operating member 56 via the connecting member 63 such that the second operating member 56 is rotated in the second rotational direction R2 from its rest position (FIG. 18) to its shifting position (FIG. 19). As the second operating member 56 rotates in the second rotational direction R2, the first abutment portion 56a of the second operating member 56 contacts the second abutment portion 88a of the pawl member 88 to pivot the pulling pawl 76 into engagement with the first pull tooth 74a of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the third stop surface 100 of the positioning ratchet 78 to hold the take-up member 58.

Figure 20:
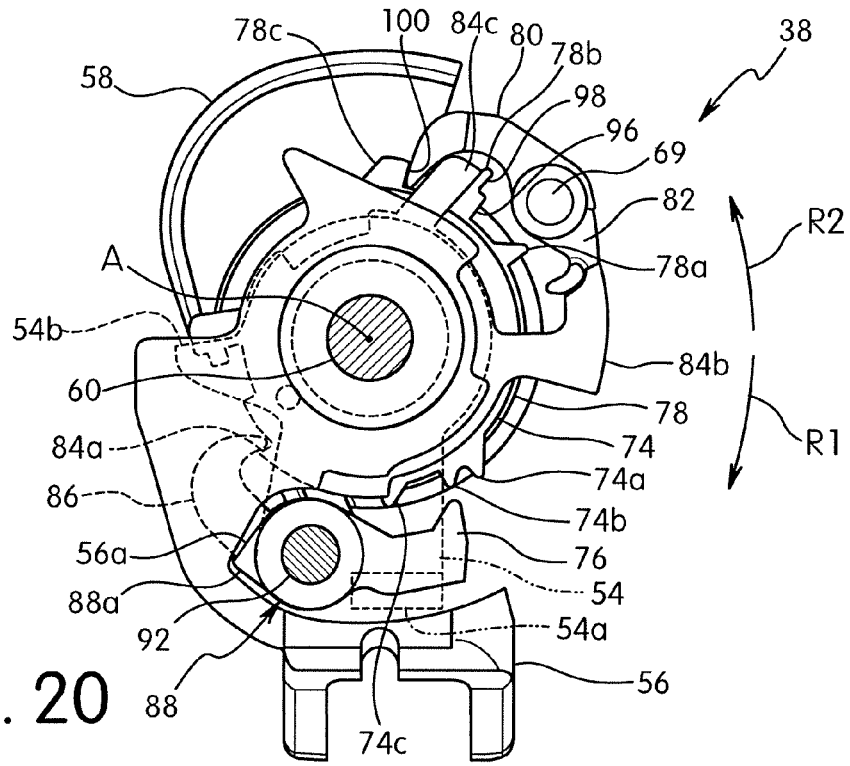
FIG. 20 is a front side view of the selected parts of the shift operating unit illustrated in FIGS. 18 and 19, but with the pull operating member being rotated from the shift operating position of FIG. 19 back to the rest position such that the front derailleur is held in the low trim position (the first intermediate position) with the chain remaining on the inner gear.
Figure 21:
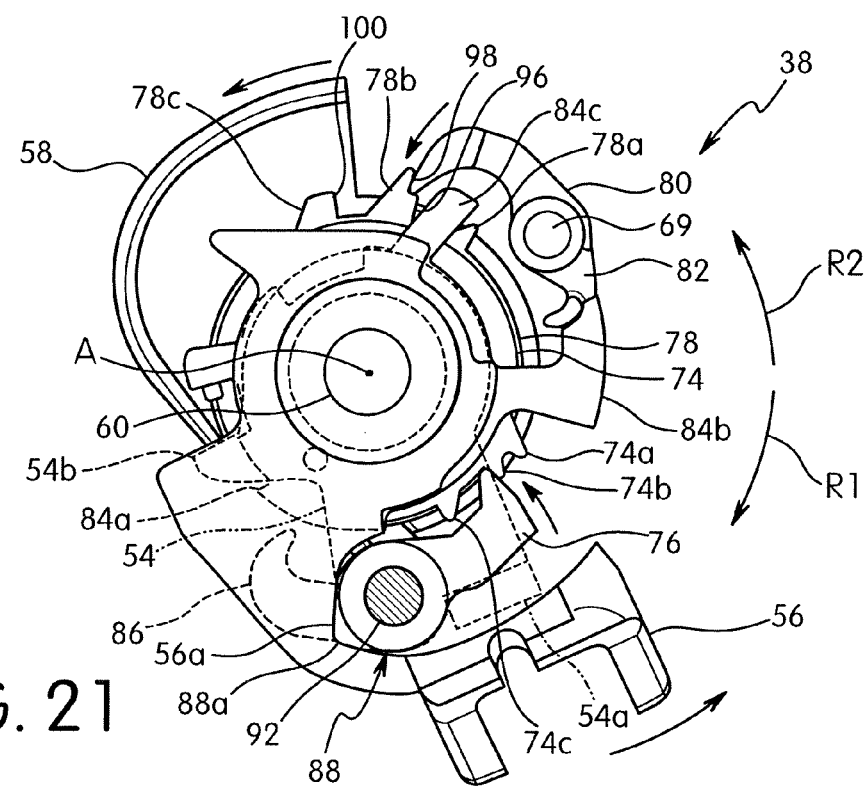
FIG. 21 is a front side view of the selected parts of the shift operating unit illustrated in FIGS. 18 to 20, but with the pull operating member being rotated to pull the inner wire such that the front derailleur is moved to a top position (the second intermediate position) with the chain being shifted to the outer gear.

When the brake/shift lever 34 is released from the shifting position of FIG. 19, the first and second operating members 54 and 56 return to their rest positions as seen in FIG. 20 and the positioning ratchet 78 is engaged with the positioning pawl 80. Now, another winding operation of the shift operating unit 38 can be performed by the rider pivotally moving the brake/shift lever 34 about the shift pivot axis P2 in the lateral inward direction towards the bicycle longitudinal center plane. Again, this pivotal movement of the brake/shift lever 34 is transmitted to the second operating member 56 via the connecting member 63 such that the second operating member 56 is rotated in the second rotational direction R2 from its rest position (FIG. 20) to its shifting position (FIG. 21). As the second operating member 56 rotates in the second rotational direction R2, the first abutment portion 56a of the second operating member 56 again contacts the second abutment portion 88a of the pawl member 88 to pivot the pulling pawl 76 into engagement with the second pull tooth 74b of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the second stop surface 98 of the positioning ratchet 78 to hold the take-up member 58.

Figure 22:
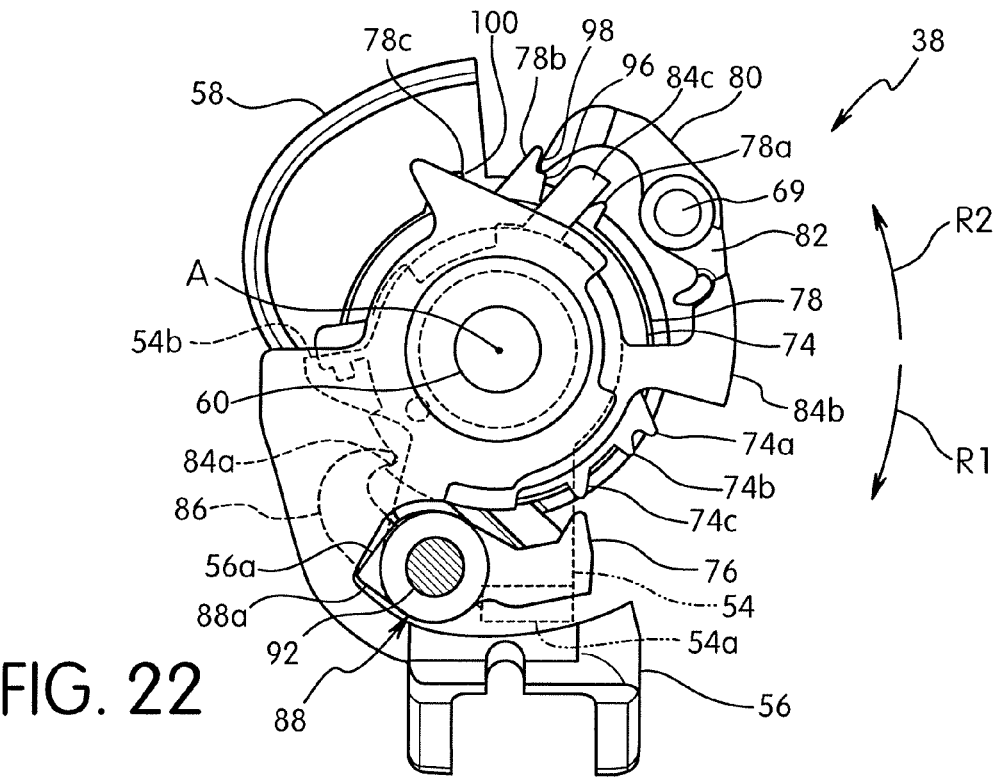
FIG. 22 is a front side view of the selected parts of the shift operating unit illustrated in FIGS. 18 to 21, but with the pull operating member being rotated from the shift operating position of FIG. 21 back to the rest position such that the front derailleur is held in the top position (the second intermediate position) with the chain remaining on the outer gear.
Figure 23:
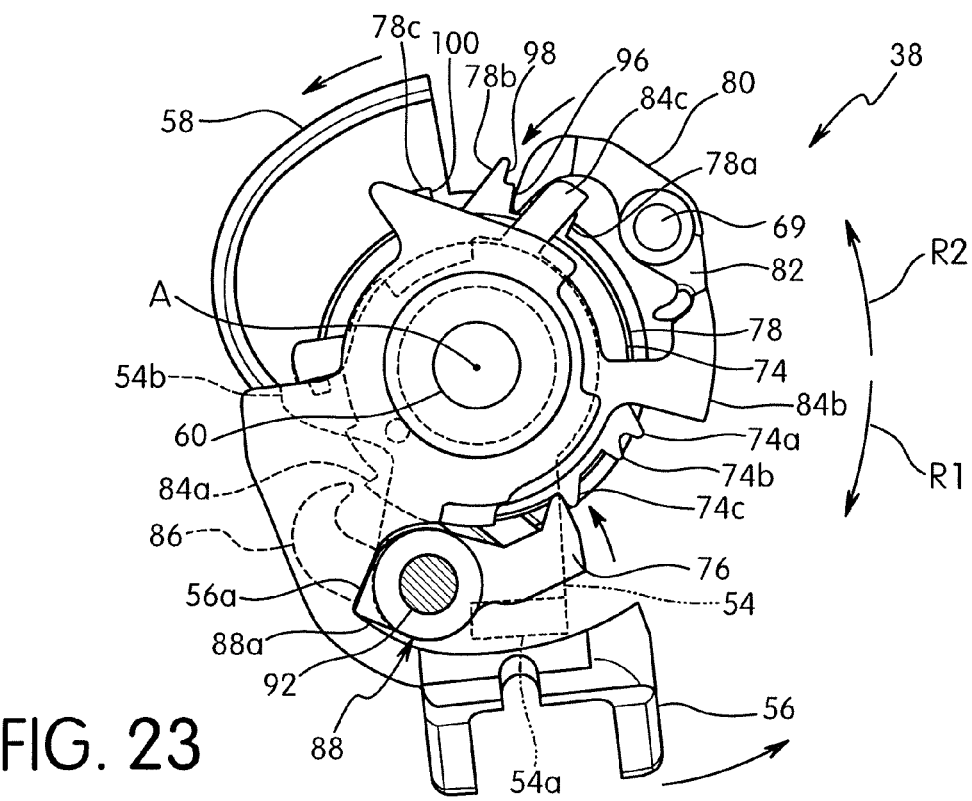
FIG. 23 is a front side view of the selected parts of the shift operating unit illustrated in FIGS. 18 to 22, but with the pull operating member being rotated to pull the inner wire such that the front derailleur is moved to a top trim position (the outermost position) with the chain remaining on the outer gear.

When the brake/shift lever 34 is released from the shifting position of FIG. 21, the first and second operating members 54 and 56 return to their rest positions as seen in FIG. 22 and the positioning ratchet 78 is engaged with the positioning pawl 80 to maintain the take-up member 58. Now, another winding operation of the shift operating unit 38 can be performed by the rider pivotally moving the brake/shift lever 34 about the shift pivot axis P2 in the lateral inward direction towards the bicycle longitudinal center plane. Again, this pivotal movement of the brake/shift lever 34 is transmitted to the second operating member 56 via the connecting member 63 such that the second operating member 56 is rotated in the second rotational direction R2 from its rest position (FIG. 22) to its shifting position (FIG. 23). As the second operating member 56 rotates in the second rotational direction R2, the first abutment portion 56a of the second operating member 56 again contacts the second abutment portion 88a of the pawl member 88 to pivot the pulling pawl 76 into engagement with the second pull tooth 74b of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the first stop surface 96 of the positioning ratchet 78 to hold the take-up member 58.

Figure 24:
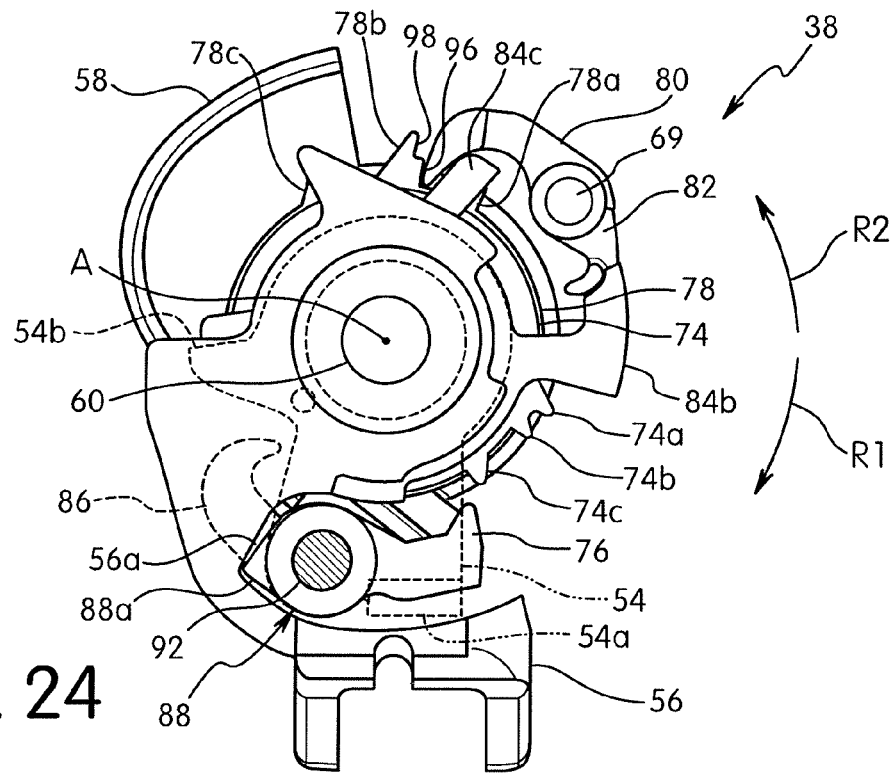
FIG. 24 is a front side view of the selected parts of the shift operating unit illustrated in FIGS. 18 to 23, but with the pull operating member being rotated from the shift operating position of FIG. 23 back to the rest position such that the front derailleur is held in the top trim position (the outermost position) with the chain remaining on the outer gear.
Figure 25:
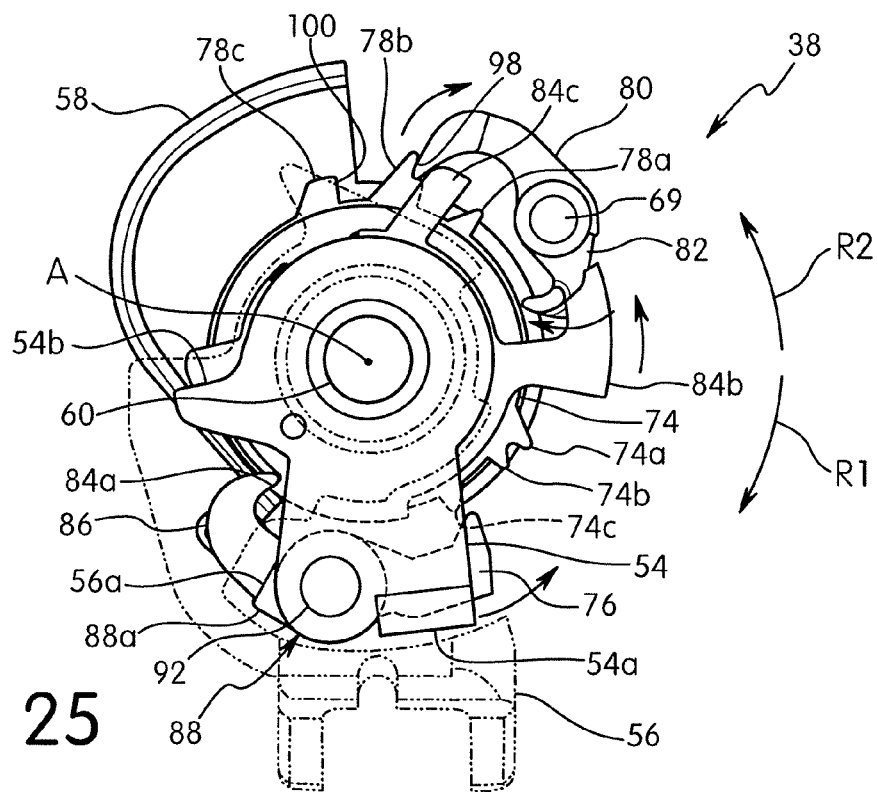
FIG. 25 is a front side view of the selected parts of the shift operating unit illustrated in FIGS. 18 to 24, but with the release operating member being rotated to release the inner wire such that the front derailleur is moved from the top trim position (the outermost position) to the top position (the second intermediate position) with the chain remaining on the outer gear.

A cable releasing operation of the shift operating unit 38 will now be discussed with reference primarily to FIGS. 24 and 25. Cable releasing operations of the shift operating unit 38 are performed by the rider pivotally moving the shift lever 36 about the shift pivot axis P3 in the lateral inward direction towards the bicycle longitudinal center plane. The shift lever 36 is operated in a single progressive movement such that in the first operating member 54 moves in a single progressive movement in the second rotational direction R2. FIG. 24 illustrates the first operating member 54 in its rest position. FIG. 25 illustrates the first operating member 54 in its shifting position.

As seen in FIG. 24, the shift operating unit 38 is in a fully wound position such that the positioning pawl 80 is contacting the first stop surface 96 of the positioning ratchet 78. As mentioned above, a cable releasing operation of the shift operating unit 38 is performed by the rider pivotally moving the shift lever 36. This pivotal movement of the shift lever 36 is transmitted to the first operating member 54 by the shift lever 36 contacting and pushing the contact flange 54a of the first operating member 54 such that the first operating member 54 is rotated in the second rotational direction R2 from its rest position (FIG. 24) to its shifting (releasing) position (FIG. 25).

As the first operating member 54 rotates in the second rotational direction R2 during a cable releasing operation of the shift operating unit 38, the release pawl 86 engages the operating tooth 84a of the release member 84 to move the release member 84 in response to the movement of the first operating member 54. This movement of the release member 84 causes the first pawl operating projection 84b to pivot the stopping pawl 82 towards the positioning ratchet 78. This movement of the release member 84 also causes the second pawl operating projection 84b to pivot the positioning pawl 80 away from the positioning ratchet 78 and out of engagement with the first stop surface 96 of the positioning ratchet 78. As a result, the take-up member 58, the pulling ratchet 74 and the positioning ratchet 78 rotate in the first rotational direction R1 under the force of the biasing element 62. However, the positioning pawl 80 engages the second stop surface 98 of the positioning ratchet 78 to stop the rotation of the take-up member 58, the pulling ratchet 74 and the positioning ratchet 78 such that the take-up member 58 is held.

Referring now to FIGS. 26 to 29, a shift operating unit 238 in accordance with a second embodiment will now be explained. The three main differences of the second embodiment from the first embodiment include (1) the first operating member 54 has been provided with a modified pawl member 288 that is biased into engagement with the pulling ratchet 74, (2) a modified release member or plate 284 has been provided that is selectively engaged by the pawl member 288, and (3) a modified second operating member 256 has been provided with a cam portion 256a (i.e., a first abutment portion) for guiding the pawl member 288 into engagement with the modified release member 284. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 26:
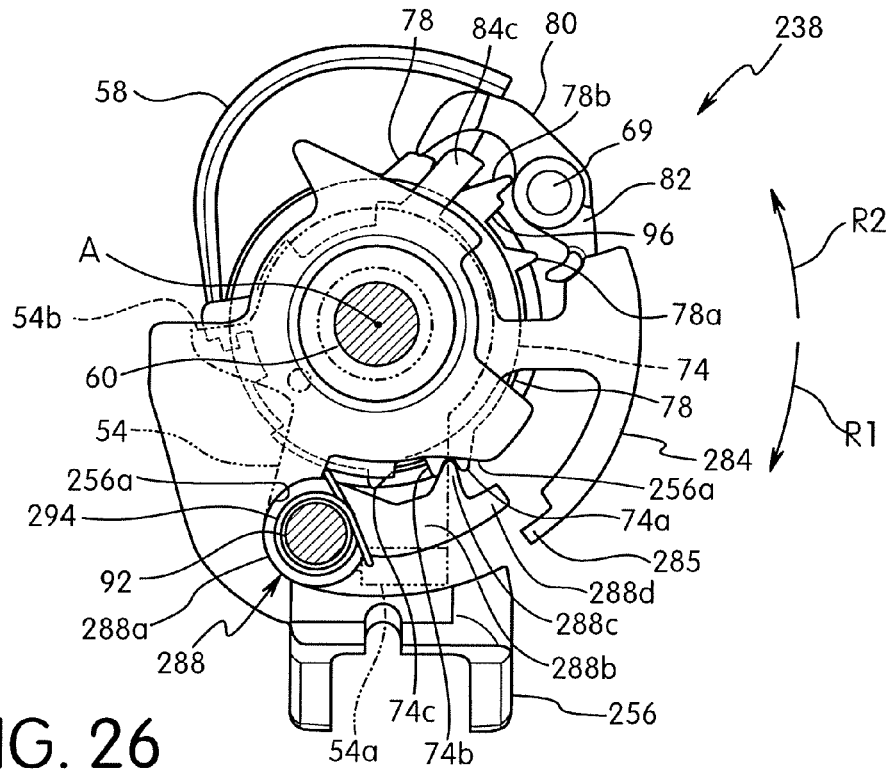
FIG. 26 is a front side view, similar to FIG. 18, of the selected parts of a shift operating unit in accordance with a second embodiment as viewed along a center axis of a main shift unit axle and with the shift operating unit being in a fully released position such that the front derailleur is held in a low position (the innermost position) with the chain on the inner gear.
Figure 27:
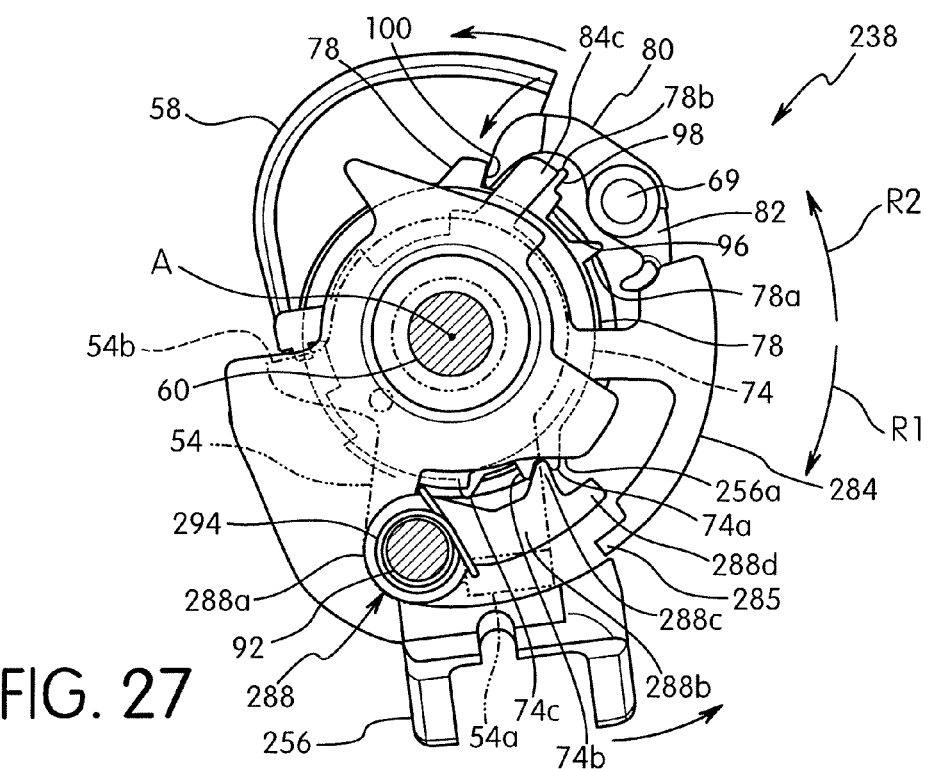
FIG. 27 is a front side view of the selected parts of the shift operating unit illustrated in FIG. 26, but with the pull operating member being rotated to pull the inner wire such that the front derailleur is moved to a low trim position (the first intermediate position) with the chain remaining on the inner gear.

As seen in FIGS. 26 and 28, while the first and second operating members 54 and 256 are in their rest position, the second operating member 256 contacts a mounting portion 288a of the pawl member 288. Here, a biasing element 294 is mounted on the pivot pin 92 to bias the pawl member 288 into engagement with the pulling ratchet 74. Also in this second embodiment, the pawl member 288 further includes an extension portion 288b extending from the mounting portion 288a. The extension portion 288b has a free end with a pulling pawl 288c and a release pawl 288d. Thus, the pulling pawl 288c and the release pawl 288d are disposed on the extension portion 288b and spaced away from the mounting portion 288a in the second rotational direction R2 with respect to the pivot axis A of the take-up member 58. As seen in FIG. 27, the mounting portion 288a of the pawl member 288 remains in contact with the second operating member 256 when the second operating member 256 is operated such that the pawl member 288 turns the pulling ratchet 74. Also in this second embodiment, the pulling pawl 288c works as the second abutment portion also. in other words, when the second operating member 256 is operated, the pulling pawl 288c (second abutment portion.) contacts the cam portion 256a (i.e., a first abutment portion) of the second operating member 256 such that the pawl member 288 moved outwardly into engagement with the release member 284. As seen in FIG. 29, the mounting portion 288a of the pawl member 288 separates from the first abutment portion 256a of the second operating member 256 when the first operating member 54 is operated such that the release pawl 288d engages the release member 284.

Referring to FIG. 30, a modified take-up member 358 is illustrated that can be used with either the first or second embodiments. Here, a pulling ratchet 374 and a positioning ratchet 378 are both integrally formed as a one-piece member with the take-up member 358. This integrated member (parts 358, 374 and 378) can be formed as either a metal member or a hard plastic member as needed and/or desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle shift operating device comprising:
a first operating member;
a second operating member including a first abutment portion; and
a take-up member pivotally supported to pivot in a first rotational direction in response to the movement of the first operating member and to pivot in a second rotational direction in response to the movement of the second operating member, the first rotational direction being opposite of the second rotational direction;
a release member movably supported to operatively release the take-up member;
a pulling ratchet fixedly coupled to the take-up member to pivot with the take-up member;
a pawl member pivotally supported on the first operating member, the pawl member including
a first pawl that selectively engages and moves the release member in response to the movement of the first operating member,
a second pawl that selectively engages and moves the pulling ratchet in response to the movement of the second operating member, and
a second abutment portion that selectively contacts the first abutment portion of the second operating member such that the pawl member pivots when one of the first and second operating members is operated.

2. The bicycle shift operating device according to claim 1, wherein
the second abutment portion of the pawl member contacts the first abutment portion of the second operating member when the second operating member is operated such that the pawl member pivots and the second pawl engages the pulling ratchet.

3. The bicycle shift operating device according to claim 1, wherein.
the pawl member includes a mounting portion disposed between the first pawl and the second pawl such that the first pawl moves away from the release member as the second pawl moves into engagement with the pulling ratchet.

4. The bicycle shift operating device according to claim 1, wherein
the pawl member includes a mounting portion and an extension portion extending from the mounting portion, the first pawl and the second pawl being disposed on the extension portion.

5. The bicycle shift operating device according to claim 4, wherein
the first and second pawls are spaced away from the mounting portion in the second rotational direction with respect to a pivot axis of the take-up member, and
the second abutment portion extends from the mounting portion in the first rotational direction with respect to the pivot axis of the take-up member.

6. The bicycle shift operating device according to claim 4, wherein
the second pawl works as the second abutment portion also.

7. The bicycle shift operating device according to claim 1, wherein
the first operating member is biased to a rest position such that the first operating member returns to the rest position after being released.

8. The bicycle shift operating device according to claim 1, wherein
the second operating member is biased to a rest position such that the second operating member returns to the rest position after being released.

9. The bicycle shift operating device according to claim 1, wherein
the pulling ratchet and the take-up member are integrally formed as a one-piece member.

10. The bicycle shift operating device according to claim 1, wherein
the take-up member, the release member and the pulling ratchet are coaxially arranged.

11. The bicycle shift operating device according to claim 1, wherein
the second abutment portion of the pawl member contacts the first abutment portion of the second operating member while the first and second operating members are in rest positions.

12. The bicycle shift operating device according to claim 11, wherein
the second abutment portion of the pawl member separates from the first abutment portion of the second operating member when the first operating member is operated such that the first pawl engages the release member.

13. The bicycle shift operating device according to claim 12, wherein
the second abutment portion of the pawl member remains in contact with the first abutment portion of the second operating member when the second operating member is operated such that the pawl member is engaged with the pulling ratchet.

14. A bicycle shift operating device comprising:
a first operating member;
a second operating member including a first abutment portion; and
a take-up member pivotally supported to pivot in a first rotational direction in response to the movement of the first operating member and to pivot in a second rotational direction in response to the movement of the second operating member, the first rotational direction being opposite of the second rotational direction;
a release member movably supported to operatively release the take-up member;
a pulling ratchet fixedly coupled to the take-up member to pivot with the take-up member;
a pawl member pivotally supported on the first operating member, the pawl member including
a first pawl that selectively engages and moves one of the release member and the pulling ratchet in response to the movement of the first operating member,
a second pawl that selectively engages and moves other of the release member and the pulling ratchet in response to the movement of the second operating member, and
a second abutment portion that selectively contacts the first abutment portion of the second operating member such that the pawl member pivots when one of the first and second operating members is operated,
the first and second operating members both pivoting in the second rotational direction with respect to a pivot axis of the take-up member to selectively operate the take-up member in the first and second rotational directions, respectively.

15. The bicycle shift operating device according to claim 14, wherein
the second abutment portion of the pawl member contacts the first abutment portion of the second operating member when the second operating member is operated such that the pawl member pivots and the second pawl engages the other of the release member and the pulling ratchet.

16. The bicycle shift operating device according to claim 15, wherein
the first pawl selectively engages and moves the release member, and the second pawl selectively engages and moves the pulling ratchet.

17. The bicycle shift operating device according to claim 16, wherein
the pawl member includes a mounting portion disposed between the first pawl and the second pawl such that the first pawl moves away from the release member as the second pawl moves into engagement with the pulling ratchet.

18. The bicycle shift operating device according to claim 16, wherein
the pawl member includes a mounting portion and an extension portion extending from the mounting portion, the first pawl and the second pawl are disposed on the extension portion.

19. The bicycle shift operating device according to claim 18, wherein
the first and second pawls are spaced away from the mounting portion in the second rotational direction with respect to a pivot axis of the take-up member, and
the second abutment portion extends from the mounting portion in the first rotational direction with respect to the pivot axis of the take-up member.

20. The bicycle shift operating device according to claim 18, wherein
the second pawl works as the second abutment portion also.

21. The bicycle shift operating device according to claim 14, wherein
the first operating member is biased to a rest position such that the first operating member returns to the rest position after being released.

22. The bicycle shift operating device according to claim 14, wherein
the second operating member is biased to a rest position such that e second operating member returns to the rest position after being released.

23. The bicycle shift operating device according to claim 14, wherein
the pulling ratchet and the take-up member are integrally formed as a one-piece member.

24. The bicycle shift operating device according to claim 14, wherein
the take-member, the release member and the pulling ratchet are coaxially arranged.

25. The bicycle shift operating device according to claim 14, wherein
the second abutment portion of the pawl member contacts the first abutment portion of the second operating member while the first and second operating members are in rest positions.

26. The bicycle shift operating device according to claim 25, wherein
the second abutment portion of the pawl member separates from the first abutment portion of the second operating member when the first operating member is operated such that the first pawl engages the one of the release member and the pulling ratchet.

27. The bicycle shift operating device according to claim 26, wherein
the second abutment portion of the pawl member remains in contact with the first abutment portion of the second operating member when the second operating member is operated such that the pawl member is engaged with the other of the release member and the pulling ratchet.

28. A bicycle shift operating device comprising:
a first operating member;

a second operating member including a first abutment portion; and a take-up member pivotally supported to pivot in a first rotational direction in response to the movement of the first operating member and to pivot in a second rotational direction in response to the movement of the second operating member, the first rotational direction being opposite of the second rotational direction;

a release member movably supported to operatively release the take-up member;

a pulling ratchet fixedly coupled to the take-up member to pivot with the take-up member;

a pawl member pivotally supported on the first operating member, the pawl member including a first pawl that selectively engages and moves one of the release member and the pulling ratchet in response to the movement of the first operating member, a second pawl that selectively engages and moves other of the release member and the pulling ratchet in response to the movement of the second operating member, and a second abutment portion that selectively contacts the first abutment portion of the second operating member such that the pawl member pivots when one of the first and second operating members is operated, the take-up member and the first and second operating members being coaxially arranged.

29. The bicycle shift operating device according to claim 28, wherein the second abutment portion of the pawl member contacts the first abutment portion of the second operating member when the second operating member is operated such that the pawl member pivots and the second pawl engages the other of the release member and the pulling ratchet.

30. The bicycle shift operating device according to claim 29, wherein the first pawl selectively engages and moves the release member, and the second pawl selectively engages and moves the pulling ratchet.

31. The bicycle shift operating device according to claim 30, wherein the pawl member includes a mounting portion disposed between the first pawl and the second pawl such that the first pawl moves away from the release member as the second pawl moves into engagement with the pulling ratchet.

32. The bicycle shift operating device according to claim 30, wherein the pawl member includes a mounting portion and an extension portion extending from the mounting portion, the first pawl and the second pawl are disposed on the extension portion.

33. The bicycle shift operating device according to claim 32, wherein the first and second pawls are spaced away from the mounting portion in the second rotational direction with respect to a pivot axis of the take-up member, and the second abutment portion extends from the mounting portion in the first rotational direction with respect to the pivot axis of the take-up member.

34. The bicycle shift operating device according to claim 32, wherein the second pawl works as the second abutment portion also.

35. The bicycle shift operating device according to claim 28, wherein the first operating member is biased to a rest position such that the first operating member returns to the rest position after being released.

36. The bicycle shift operating device according to claim 28, wherein the second operating member is biased to a rest position such that the second operating member returns to the rest position after being released.

37. The bicycle shift operating device according to claim 28, wherein the pulling ratchet and the take-up member are integrally formed as a one-piece member.

38. The bicycle shift operating device according to claim 28, wherein the take-up member, the release member and the pulling ratchet are coaxially arranged.

39. The bicycle shift operating device according to claim 28, wherein the second abutment portion of the pawl member contacts the first abutment portion of the second operating member while the first and second operating members are in rest positions.

40. The bicycle shift operating device according to claim 39, wherein the second abutment portion of the pawl member separates from the first abutment portion of the second operating member when the first operating member is operated such that the first pawl engages the one of the release member and the pulling ratchet.

41. The bicycle shift operating device according to claim 40, wherein the second abutment portion of the pawl member remains in contact with the first abutment portion of the second operating member when the second operating member is operated such that the pawl member is engaged with the other of the release member and the pulling ratchet.

* * * * *